United States Patent
Divan et al.

(10) Patent No.: US 10,680,438 B2
(45) Date of Patent: Jun. 9, 2020

(54) OPTIMIZING VOLTAGE AND VAR ON THE ELECTRIC GRID USING DISTRIBUTED VAR SOURCES

(71) Applicant: Varentec, Inc., Santa Clara, CA (US)

(72) Inventors: Deepakraj Divan, Santa Clara, CA (US); Rohit Moghe, Santa Clara, CA (US)

(73) Assignee: Varentec, Inc., Santa Clara, CA (US)

( * ) Notice: Subject to any disclaimer, the term of this patent is extended or adjusted under 35 U.S.C. 154(b) by 284 days.

(21) Appl. No.: 14/695,880

(22) Filed: Apr. 24, 2015

(65) Prior Publication Data

US 2015/0311718 A1    Oct. 29, 2015

Related U.S. Application Data

(60) Provisional application No. 61/983,634, filed on Apr. 24, 2014.

(51) Int. Cl.
*H02J 3/18* (2006.01)

(52) U.S. Cl.
CPC ............ *H02J 3/18* (2013.01); *Y02E 40/30* (2013.01)

(58) Field of Classification Search
None
See application file for complete search history.

(56) References Cited

U.S. PATENT DOCUMENTS

| | | |
|---|---|---|
| 5,136,233 A | 8/1992 | Klinkenberg et al. |
| 5,541,498 A | 7/1996 | Beckwith |
| 2003/0076075 A1 | 4/2003 | Ma et al. |
| 2004/0010478 A1 | 1/2004 | Peljto et al. |
| 2009/0024255 A1* | 1/2009 | Penzenstadler ....... H02J 3/1842 700/297 |
| 2010/0067271 A1 | 3/2010 | Garces et al. |
| 2010/0327657 A1 | 12/2010 | Kuran |
| 2012/0153888 A1 | 6/2012 | Jung |
| 2012/0191262 A1 | 7/2012 | Marcus |
| 2012/0197450 A1* | 8/2012 | Krok ........................ H02J 3/16 700/291 |

(Continued)

FOREIGN PATENT DOCUMENTS

WO    2013065114 A1    5/2013

OTHER PUBLICATIONS

'Varentec Launches the Distributed, Voltage-Correcting Grid Sensor', Greentech Media, Jeff St. John (2013).*

(Continued)

*Primary Examiner* — Bernard G Lindsay
(74) *Attorney, Agent, or Firm* — Sheppard Mullin Richter & Hampton LLP

(57) ABSTRACT

A plurality of edge of network grid volt ampere reactive (VAR) sources are provided in a power system in order to effectuate control at a customer level, which in turn effectuates control at a feeder level, which in turn effectuates control of an entire power system or wide area electric grid network. By optimally selecting voltage setpoints and applying such voltage setpoints to the plurality of edge of network grid VAR sources, the power system can be configured to self-balance, power factor compensation can be determined without the need for measuring load power factor. Moreover, traditionally volatile voltages at the feeder can be flattened, and VAR control can be realized.

11 Claims, 20 Drawing Sheets

(56) References Cited

U.S. PATENT DOCUMENTS

| | | |
|---|---|---|
| 2013/0024040 A1 | 1/2013 | Vukojevic et al. |
| 2013/0030586 A1* | 1/2013 | Milosevic ................ H02J 3/12 |
| | | 700/292 |
| 2013/0030599 A1 | 1/2013 | Milosevic et al. |
| 2013/0096724 A1 | 4/2013 | Divan et al. |
| 2013/0138260 A1 | 5/2013 | Divan et al. |
| 2013/0168963 A1* | 7/2013 | Garcia ...................... H02J 3/18 |
| | | 290/44 |
| 2013/0173078 A1 | 7/2013 | Divan et al. |
| 2013/0293021 A1 | 11/2013 | Varma |
| 2014/0039711 A1 | 2/2014 | Divan et al. |
| 2014/0046500 A1 | 2/2014 | Varma |
| 2014/0103888 A1 | 4/2014 | Divan et al. |
| 2014/0176090 A1* | 6/2014 | Harjeet ...................... H02J 3/12 |
| | | 323/209 |
| 2014/0249688 A1 | 9/2014 | Ansari |
| 2014/0288725 A1* | 9/2014 | Itaya ........................ H02J 3/00 |
| | | 700/298 |
| 2014/0350742 A1 | 11/2014 | Matan et al. |
| 2015/0112496 A1* | 4/2015 | Fisher ...................... H02J 3/16 |
| | | 700/291 |
| 2015/0311718 A1 | 10/2015 | Divan et al. |
| 2016/0204609 A1 | 7/2016 | Tyler et al. |

OTHER PUBLICATIONS

'Voltage Tolerance Boundary', Pacific Gas and Electric Company (1999).*

'Varentec Launches the Distributed, Voltage-Correcting Grid Sensor' as captured by the Wayback Machine, 2013—https://web.archive.org/web/20130206033021/https://www.greentechmedia.com/articles/read/varentec-launches-the-distributed-voltage-correcting-grid-sensor.*

Patent Cooperation Treaty, International Search Report for PCT/US2016/065009, dated Apr. 7, 2017, pp. 1-4.

Federal Energy Regulatory Commission, Payment for Reactive Power, Commission Staff Report AD 14-7, Apr. 22, 2014, pp. 1-48.

Patent Cooperation Treaty, International Search Report for PCT/US2015/027590, dated Jul. 23, 2015, pp. 1-2.

Second Office Action in European Patent Application No. 15783843.4, dated May 27, 2019.

* cited by examiner

OPTIMIZING VOLTAGE AND VAR ON THE ELECTRIC GRID USING DISTRIBUTED VAR SOURCES

CROSS-REFERENCE TO RELATED APPLICATIONS

The present application claims the benefit of U.S. Provisional Patent Application No. 61/983,634 filed Apr. 24, 2014, which is incorporated herein by reference in its entirety.

FIELD

Various embodiments generally relate to voltage and volt-ampere reactive power (VAR) management along transmission and distribution network. More particularly, various embodiments are related to controlling end consumer, feeder, and/or system-wide voltage and VAR levels using distributed VAR sources

DESCRIPTION OF THE RELATED ART

A primary purpose of voltage control is maintaining acceptable voltage (e.g. in the United States, as per the American National Standards Institute (ANSI) band, the voltage at the service entrant is to be maintained between 120 volts plus or minus five percent) at the service entrance of customers served by a feeder under all possible operating conditions. Electric utilities traditionally maintain distribution system voltage within the acceptable range using transformers with moveable taps that permit voltage adjustments under load. Other methods include de-energized tap changers (DETC) where the transformers are de-energized for changing the tap setting and then re-energized once the tap is changed. When utilizing the DETC method, the tap remains fixed once changed and the voltage is not actively regulated. Voltage regulators located in substations and on the lines, as well as substation transformers are commonly used for voltage control purposes. These transformers can be referred to as Load Tap Changers (LTCs) and are equipped with a voltage-regulating controller that determines whether to raise or lower the transformer tap settings or leave the tap setting unchanged based on "local" voltage and load measurements.

An optimal strategy for distribution feeder design and operation is to establish acceptable voltage conditions for all customers while meeting certain set objectives which could be reducing energy consumption, reducing peak demand, reducing line losses on the system (in other words maximizing efficiency), reducing voltage loss across the feeder and stabilizing the voltage throughout the feeder. The voltage profile along the distribution feeder and the flow of VARs on the feeder are typically maintained by a combination of voltage regulators and switched capacitor banks installed at various locations on the feeder and in its associated substation. Each voltage regulator includes a controller that raises or lowers the voltage regulator tap position in response to local (at the device) current, voltage, time of day, or temperature measurements. Similarly, each capacitor bank includes a controller that switches the bank on or off in response to its local measurements. These capacitor banks serve as a source of reactive power that the electric utility can position at any point on the feeder. Installing capacitor banks at strategic locations on the feeder reduces the amount of reactive power supplied by the transmission system, reduces the flow of VARs from the substation to the loads, reduces the current flowing from the transmission and distribution system to serve a given load, reduces the associated electrical losses, and increases the voltage at the point of the capacitor.

Traditionally, feeder voltage regulators and switched capacitor banks are operated as completely independent (stand-alone) devices, with no direct coordination between the individual controllers. This may allow for maintaining coarse voltage control and reactive power flow near the controllers, but as these technologies apply to the primary side (medium voltage side), are electromechanical, act slowly, and are sparsely deployed, they provide highly sub-optimal performance for meeting feeder level objectives such as reduction in energy, reduction in demand, etc. Smart distribution voltage control achieves other operating objectives in addition to the primary function of maintaining acceptable voltage. A common smart distribution voltage control function may be referred to as Conservation Voltage Reduction (CVR). With CVR, the system intentionally lowers the voltage on the distribution feeder to the lowest acceptable voltage value to achieve valuable benefits to the electric utility and consumers, such as reduced demand and energy consumption. Smart VAR control uses complex algorithms to control switched capacitors, feeder regulators and LTCs to control VAR flow and feeder voltage as feeder conditions vary during the day. However, rather than basing the control actions solely on local measurements, the Volt-VAR control function bases switching decisions on measurements taken at the substation and/or end of the feeder, where total VAR flow and/or voltage is readily observable. As an example, when it is detected that the VAR flow to the feeder is excessive at the substation, remote control facilities are used to operate the switched capacitor banks as needed. Still other techniques attempt to (relying on meters) implement voltage and VAR optimization by identifying the "weakest" voltage nodes, and adjusting LTCs and capacitor banks accordingly to achieve smart distribution voltage control.

However, at least one drawback for each of the above-noted schemes is their reliance on corrections on the primary side of the distribution transformer. A substantial, and variable part of the reactive voltage drop occurs across the transformer reactance. This is either never sensed, or remains uncompensated for without any secondary side fast and dynamic Volt-VAR control devices. Moreover, medium voltage assets (i.e., LTCs and capacitor banks) are electromechanical in nature and have limited life. In addition, both LTCs and capacitor banks can switch only a few times a day, typically 2-10 times a day. The actuation process takes anywhere from 30 seconds to 15 minutes depending on the settings of the asset (LTC, capacitor bank, etc.). Further, capacitor banks once switched off need several minutes of discharge time before they can be re-engaged. Due to all these limitations of primary side asset, voltage VAR control achievable through the control of primary side assets is not only sub-optimal, but is also severely limited. Furthermore, with distributed generation (DG) such as solar photovoltaic (PV), being introduced on the grid at an ever increasing rate, the efficacy of these sparsely deployed primary assets is highly diminished. Finally, as DG and electric vehicles (EVs) increase, the load distribution and dynamics will change progressively. Consequently, it would require revisiting the placement of the primary side assets more frequently which would essentially increase operating expenditure for utilities.

BRIEF SUMMARY OF THE DISCLOSURE

In accordance with one embodiment, a computer-implemented method for voltage and volt ampere reactive (VAR)

control of a power system comprises determining a transformer voltage setpoint. Additionally, the method comprises determining voltage setpoints for a set of distributed VAR devices implemented in the power system to be equal to that of the transformer voltage setpoint to effectuate self-balancing of the power system.

In accordance with another embodiment, a system comprises a service transformer and a load coupled to the service transformer. Furthermore, the system comprises at least one distributed VAR device coupled to the load, the at least one distributed VAR device being operative in response to a voltage setpoint, wherein the voltage setpoint associated with a controllable transformer on a high-voltage or primary side.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Figure 1:
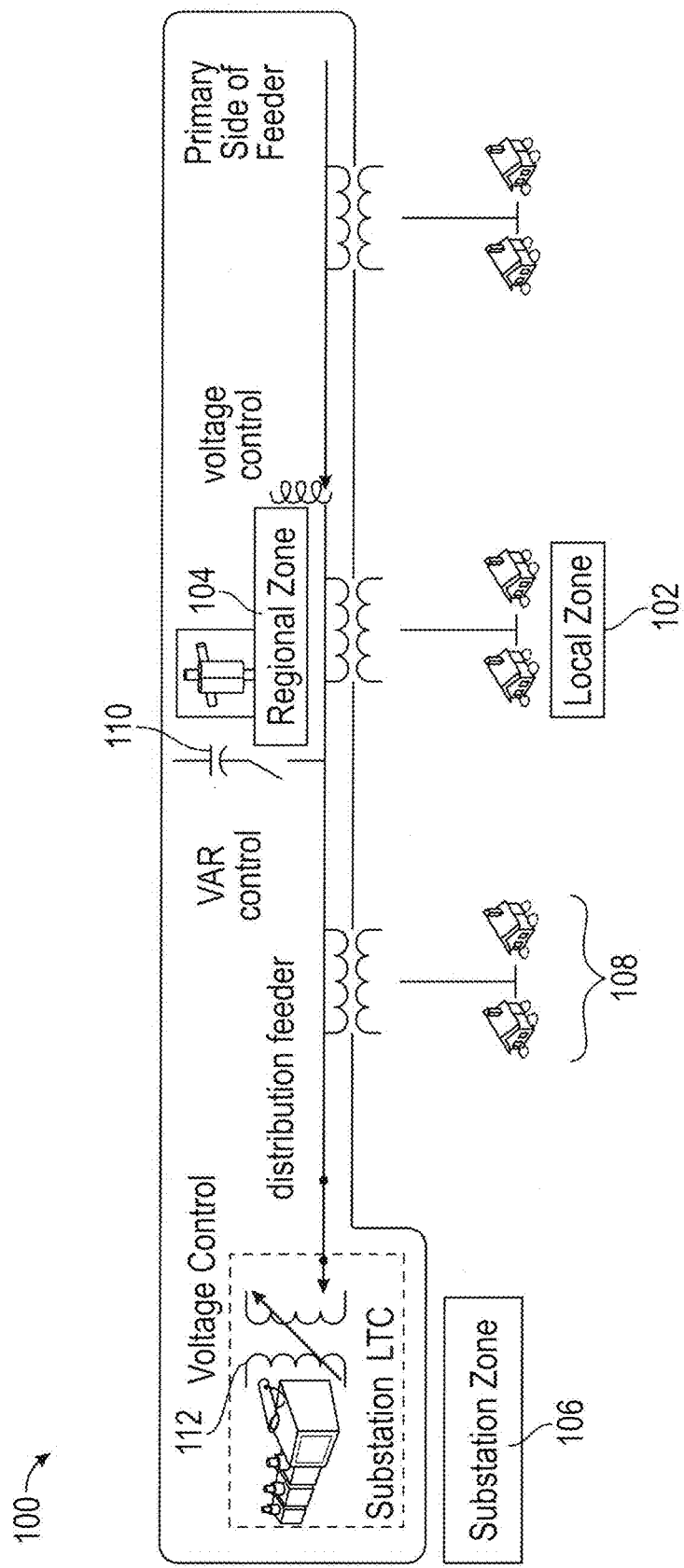
FIG. 1 illustrates an example power system using a conventional voltage and VAR control scheme.

As alluded to previously, conventional voltage and VAR control relies on assets that are on the primary side of the feeder and assumes an averaged model for the devices. FIG. 1 illustrates an example power system 100 that is utilizing conventional voltage and VAR control. In the illustrated example, the power system 100 may include a local zone 102, a regional zone 104, and a substation zone 106. The local zone 102 may include customer loads 108 that may be highly variable and stochastic. As can be appreciated, there is no voltage control in the local zone 102.

The regional zone 104 may include the aforementioned switched capacitor banks 110 that provide VAR control. The control provided by the switched capacitor banks 110 may be slow and "lumpy." For example, the switched capacitor banks 110 may be switched only, e.g., two to three times a day. Further, the response time of capacitor bank can be on the order of several seconds to minutes. Moreover, they cannot compensate for the voltage drop across distribution transformers that result in significant amounts of volatility at the grid edge. Moreover, problems can occur with, e.g., long rural circuits with voltages that can tend to fall well below the minimum voltage limits, circuits with large amounts of solar power injected therein which can cause voltages to rise and fall with the overhead passage of the sun and/or clouds. The regional zone 104 may contain line voltage regulators (LVR) for voltage control. LVRs suffer from similar problems of slow response and limited number of switchings per day.

The substation zone 106 may include LTCs, e.g., LTC 112, that provide voltage control. Voltage, current, and power flows may be measured and fed to a supervisory control and data acquisition ("SCADA") system(s) (not shown). Performance of the electric grid (e.g., losses, generation, demand, etc.) may be optimized according to a modeling and measurement-based optimization that drives the settings utilized for the LTCs, LVRs and capacitor banks.

It should be understood that the range of control for conventional voltage and VAR control in a power system, such as power system 100, tends to be limited and typically centralized. For example, and with regard to the substation zone 106, controlling the setting of LTC 112 can allow control of the feeder voltage to be achieved with a control range of approximately plus or minus eight percent. A one percent drop in voltage, for example, may reduce power by about 1 percent and capacitor bank VARs by about two percent. Accordingly, in the regional zone 104, capacitor bank 110 can inject VARs resulting in an increase in voltage on the primary side of the feeder. The voltage (240 Volt base) may be increased by about one to two volts for a typical feeder of 300 kVARs. In the local zone 102, both the LTC 112 and the switched capacitor bank 110 can regulate voltage for all connected loads (e.g., houses 108) simultaneously. Nevertheless, the LTC 112 and the switched capacitor bank 110 cannot manage different actions needed at different load points. As such, complex optimization cannot be realized using conventional techniques.

Figure 2:
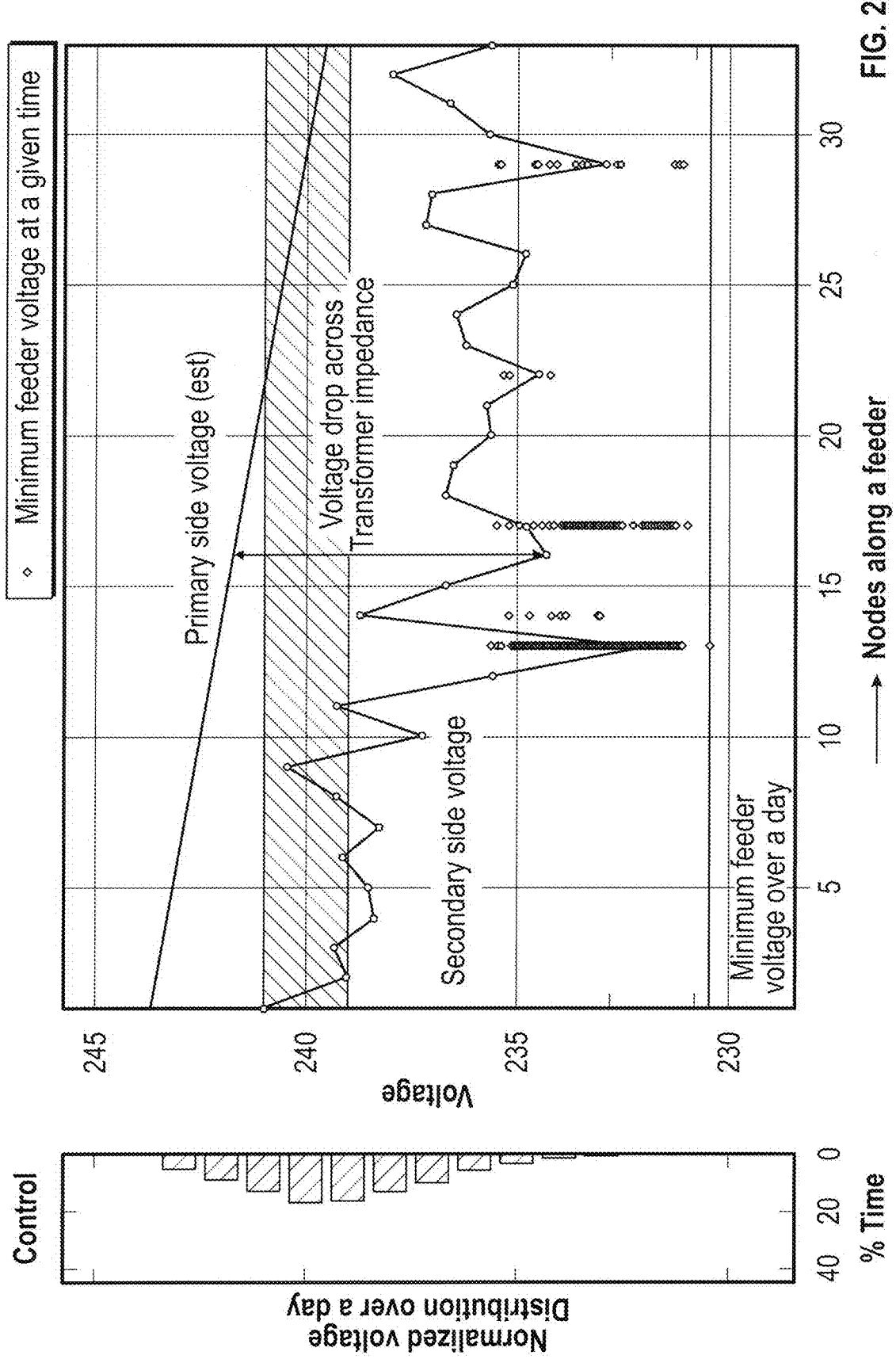
FIG. 2 is a chart illustrating example local voltages along a feeder in a conventional system.

FIG. 2 illustrates an example of actual local voltages along a feeder in a conventional power system, such as power system 100 of FIG. 1. In the example illustrated in FIG. 2, no edge of network grid control is utilized. Therefore, varying levels of control efforts may be required at different nodes along the feeder, which is not possible under a centralized control scheme. As can be appreciated, LTCs cannot compensate for the voltage drop across distribution transformers that result in the illustrated voltage volatility at the grid edge. Again, a substantial, and variable part of the reactive voltage drop occurs across the transformer reactance, which is either never sensed, or goes uncompensated.

Accordingly, various embodiments are directed to voltage and VAR control using edge of network grid VAR source systems and methods. Such edge of network grid VAR source systems and methods may be deployed to an existing power system and may be configured to work with existing LTCs, LVRs and/or capacitor bank infrastructure. That is, voltage and VAR control is delivered using edge of network grid VAR sources, such as but not limited to, edge of network grid optimization (ENGO) devices, smart inverters, smart meters, electric vehicle charges, and the like (one outcome of the voltage and VAR control being voltage and VAR optimization). Examples of VAR sources are described in U.S. patent application Ser. No. 14/659,418 entitled "Systems and Methods for Edge of Network Voltage Control of a Power Grid," which is incorporated herein by reference in its entirety.

By expanding the ubiquity of such devices that deliver voltage control using edge of network grid VAR sources, all levels/aspects of a power system can be controlled. That is, utilizing such edge of network grid VAR sources can effectuate control at the customer level (e.g., load zone). An aggregate of customer level control can result in effectuating control at the feeder level (e.g., regional zone). Upon gaining control of an aggregate of feeders (e.g., substation level), an entire power system or wide area electric grid network can be controlled. It should be noted that as utilized herein, the term VAR source can refer to any autonomous or remotely controlled electronic device capable of directing VARs into an electric grid entry point. Again, examples may include but are not limited to a dedicated VAR source, such as an ENGO, a static synchronous compensator (STATCOM), an inverter or smart (e.g., solar) inverter that can deliver VARs, a VAR-enhanced smart meter, an electric vehicle charger, an ENGO device, a smart home automation device, etc.

In particular, decoupled volt and VAR control at the feeder level is provided. Various embodiments may also provide dynamic lead-lag VAR support for the sub-transmission network. An unprecedented control of feeder voltage profile is provided. Grid optimization such as line loss reduction and peak demand reduction is realized. Grid integration such as distributed photovoltaic (PV), load/source dynamics mitigation is also realized. Grid support, such as weak node voltage support and reduced momentary impact is provided. Further still, various embodiments may provide automatic power factor control at the node and/or feeder level. It should be noted that feeder health may be ensured for various embodiments' visibility to feeder level secondary voltages. Still other embodiments may integrate decentralized control with centralized command. Additionally, it should be appreciated that power systems utilizing voltage and VAR control in accordance with various embodiments are less susceptible to and/or resilient with respect to unit/device failure.

Figure 3:
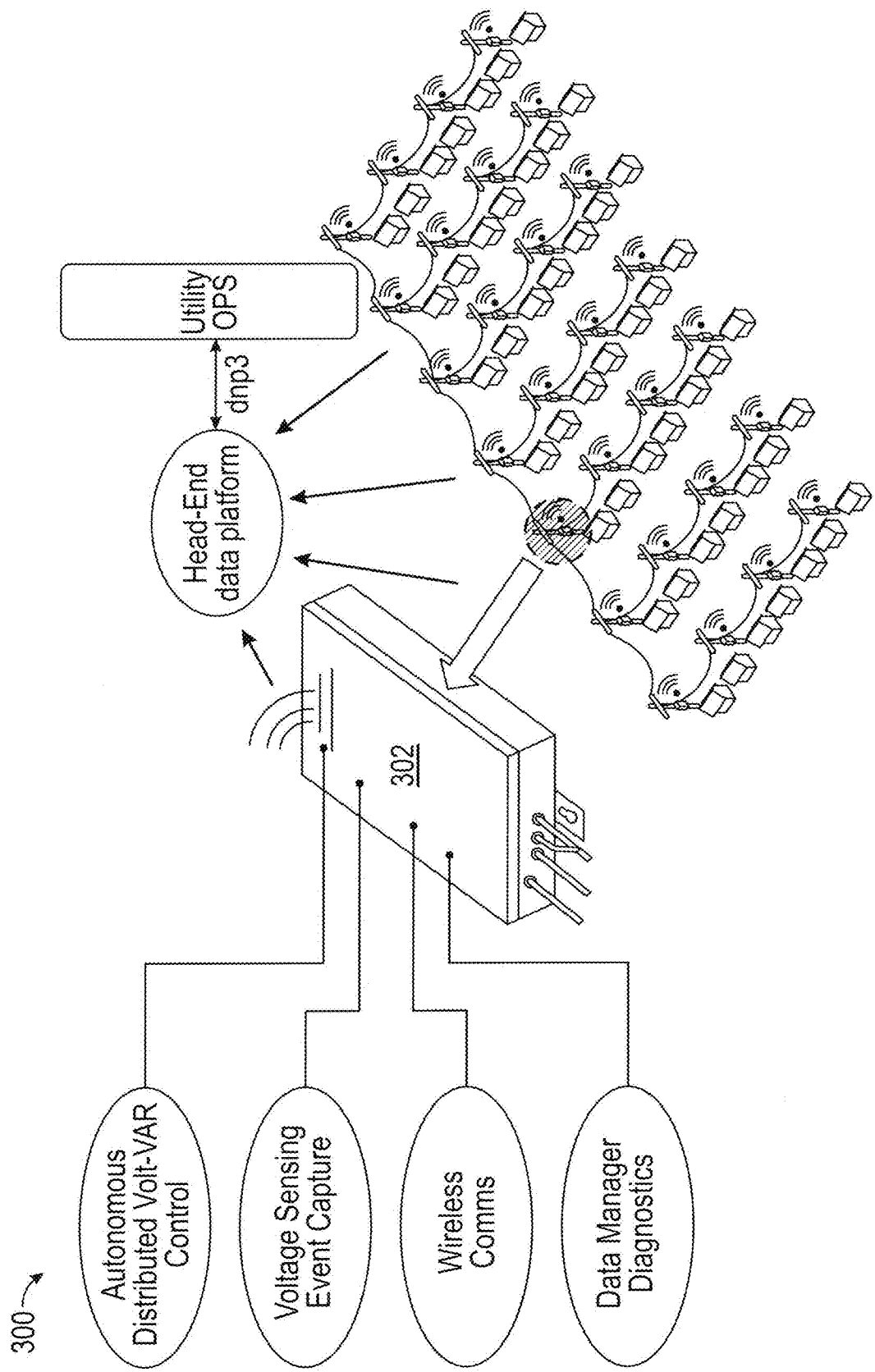
FIG. 3 illustrates a power system with edge of network grid control in accordance with various embodiments of the technology disclosed herein.

FIG. 3 illustrates an example power system 300 in which edge of network grid voltage and VAR control may be implemented in accordance with one embodiment of the technology disclosed herein. As illustrated in FIG. 3, distributed VAR devices such as edge of network grid optimization (ENGO-V) devices may perform edge of network grid optimization. FIG. 3 illustrates one example of a distributed VAR device 302 (which as indicated previously, may be an ENGO-V device). Distributed VAR device 302 may be a decentralized and distributed voltage and VAR regulator unit. Distributed VAR device 302 may have implemented therein, regulation, monitoring, and communications functionalities. An ENGO-V device can provide fast, autonomous, variable responses, as well as system analytics and diagnostics, and is one of a plurality of edge of network grid devices that can be utilized to achieve voltage and VAR control as disclosed herein.

Figure 4:
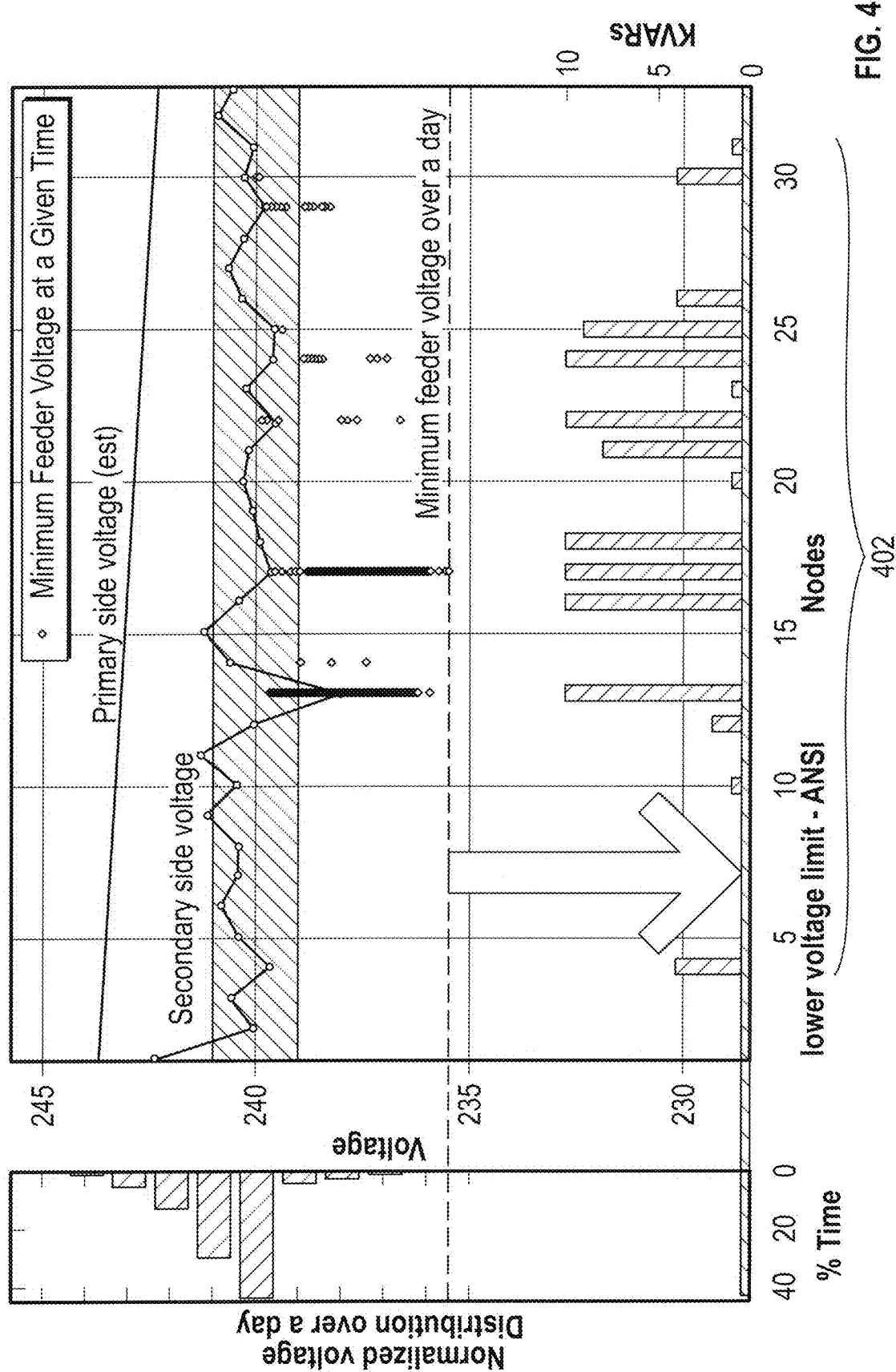
FIG. 4 is a chart illustrating example local voltages along a feeder in a power system with edge of network grid control where a voltage VAR optimization device is enabled in accordance with various embodiments of the technology disclosed herein.

FIG. 4, similar to FIG. 2 illustrates examples of actual voltages along a feeder in a power system. However, the power system whose voltages are charted in FIG. 4 utilizes a voltage and VAR control device, e.g., distributed VAR device such as an ENGO-V. In contrast to the voltage illustrated in FIG. 2, the voltage illustrated in FIG. 4 can be appreciated as being less volatile. This is because the voltage and VAR control device can provide corrective measures at each individual node at a specific time. Bars 402 illustrate this corrective effort at each individual node at a specific time. It should be noted, however, that different control efforts may be needed at different nodes at different instances in time. Regardless, it can be appreciated that the minimum feeder voltage of the day is improved (going from just over 230 Volts to just over 235 Volts in this example), the voltage is distributed more evenly, the secondary side voltage is more stable, etc.

Figure 5B:
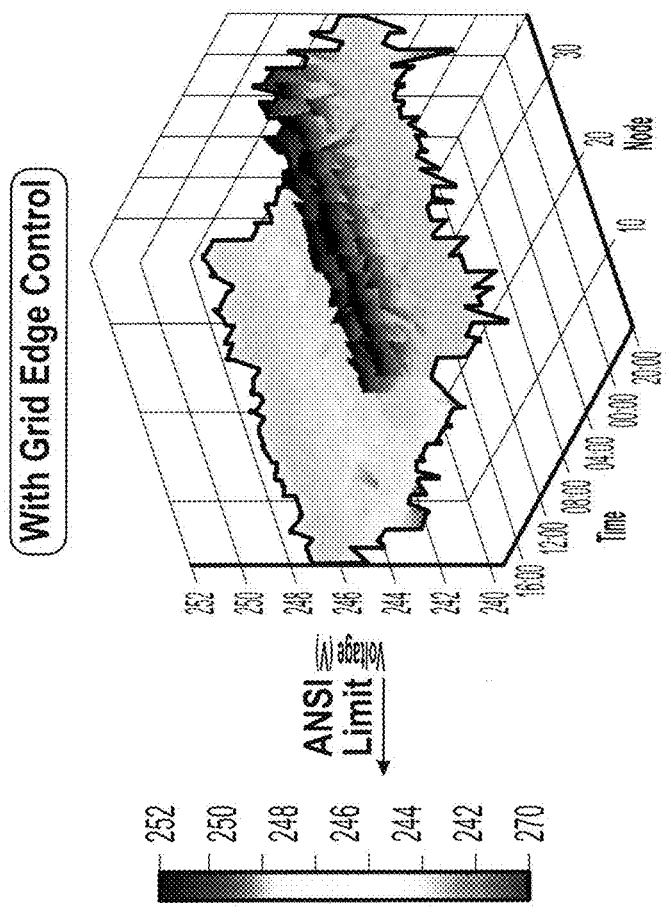
FIG. 5B illustrates an example voltage profile of a power system with edge of network grid control enabled in accordance with various embodiments of the technology disclosed herein.
Figure 5A:
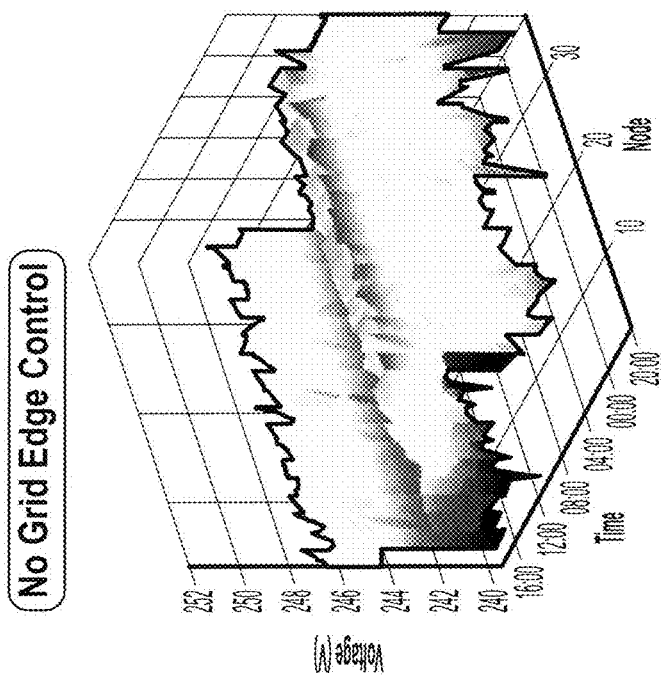
FIG. 5A illustrates an example voltage profile of a conventional power system.

FIGS. 5A and 5B illustrate the respective voltage profiles of a conventional power system and a power system configured in accordance with various embodiments, i.e., where voltage and VAR control is delivered using edge of network grid VAR sources. As illustrated in FIG. 5A, the edge of network grid voltage of the conventional power system without edge of network grid control is volatile/unstable and experience extended periods of low voltages. The lowest voltage points migrate to different nodes in the system at different times of the day.

In contrast to the voltage profile illustrated in FIG. 5A, the voltage profile illustrated in FIG. 5B is flattened. In the illustrated example, the edge of network grid VAR source has a setpoint of 240 V. As can be appreciated, the voltage volatility is reduced, the secondary and primary side voltage profile is improved, and additionally, self-regulating power factor correction and the ability to control feeder VARs are also provided. Significant levels of voltage loss reduction is observed. It should be noted that an additional margin of 7V is obtained for achieving enhanced energy savings, demand control etc.

Figure 6:
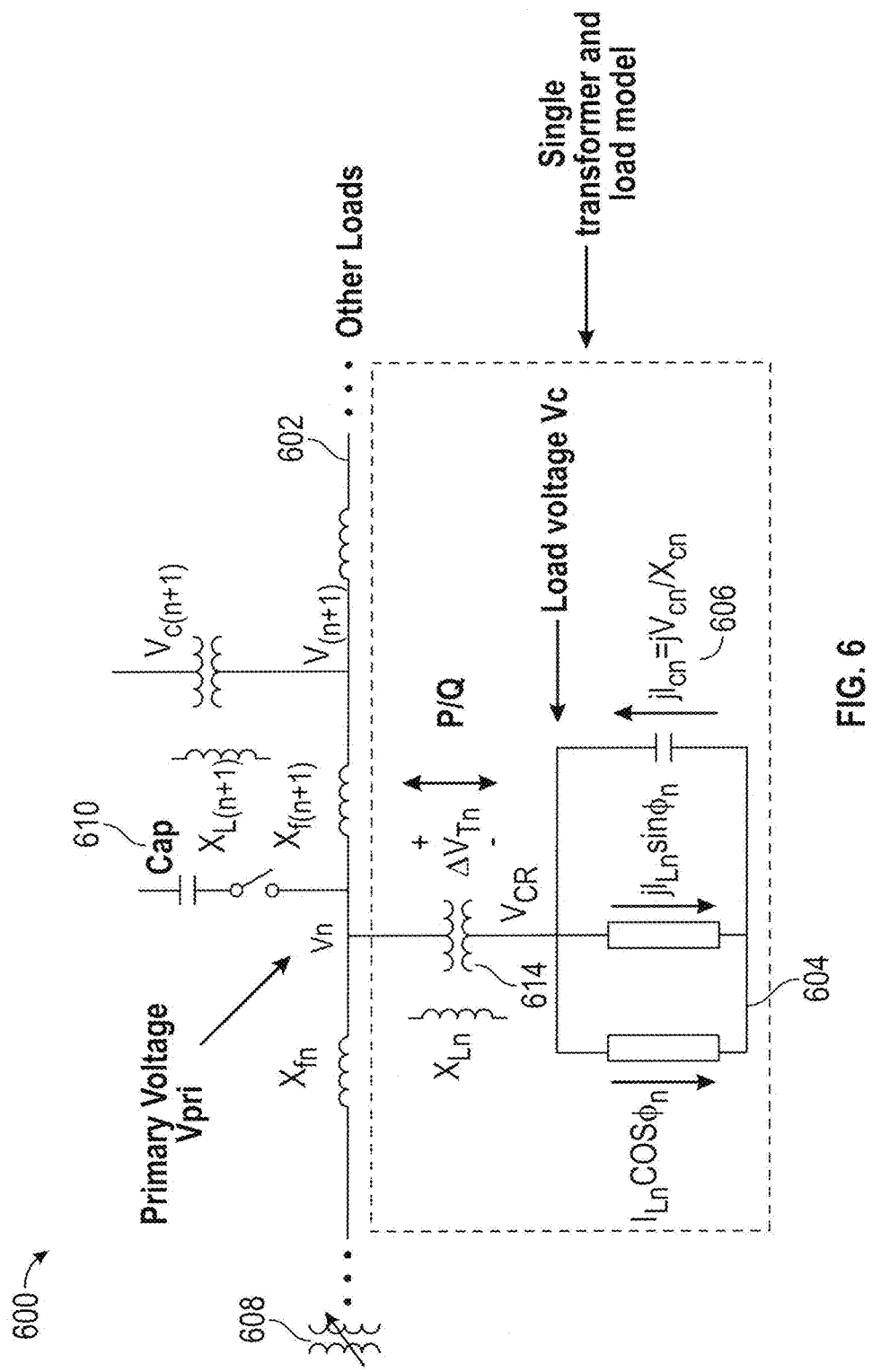
FIG. 6 is a schematic representation of an example power system and load model.

FIG. 6 illustrates an example diagram of a power system 600 in which voltage and VAR control is effectuated in accordance with various embodiments. The illustrated power system 600 may be modeled as including a feeder 602, a load 604, and an edge of network grid VAR device 606 in accordance with one embodiment. The power system and load model may include, e.g., a 25 kVA Transformer (7 kV/240V), six percent impedance (including line), a Load with 5-25 kVA and 0.7 to 1.0 PF, a distributed VAR device (e.g., an ENGO device) that may provide 0-10 kVAR leading, a 3 MW feeder, a 300 kVAR/phase primary capacitor bank, and a transmission line, where the line impedance is 5.65 ohms and line length is 3 miles. It should be noted that although the illustrated example includes a shunt load model, one of ordinary skill in the art would understand that other types of load models may be used while still achieving the same or similar results as disclosed herein.

The feeder model may include an LTC 608, line impedances, primary capacitor bank 610, load 604 (kW/kVAR), and distributed VAR device 606. The primary voltage $V_{PRI}$ is not substantially impacted by one individual load, but may be impacted by the voltage at the substation as well as the aggregated feeder load and VARs. The load voltage Vc can be defined as $V_{PRI}$ minus the voltage drop across transformer 614. The load voltage varies with $V_{PRI}$, load kW (P) and kVAR (Q). Furthermore, the distributed VAR device 606 may impact the effective kVAR (Q) flowing into the feeder 602. It should be noted that a single load is too small to change the primary voltage.

Figure 7:
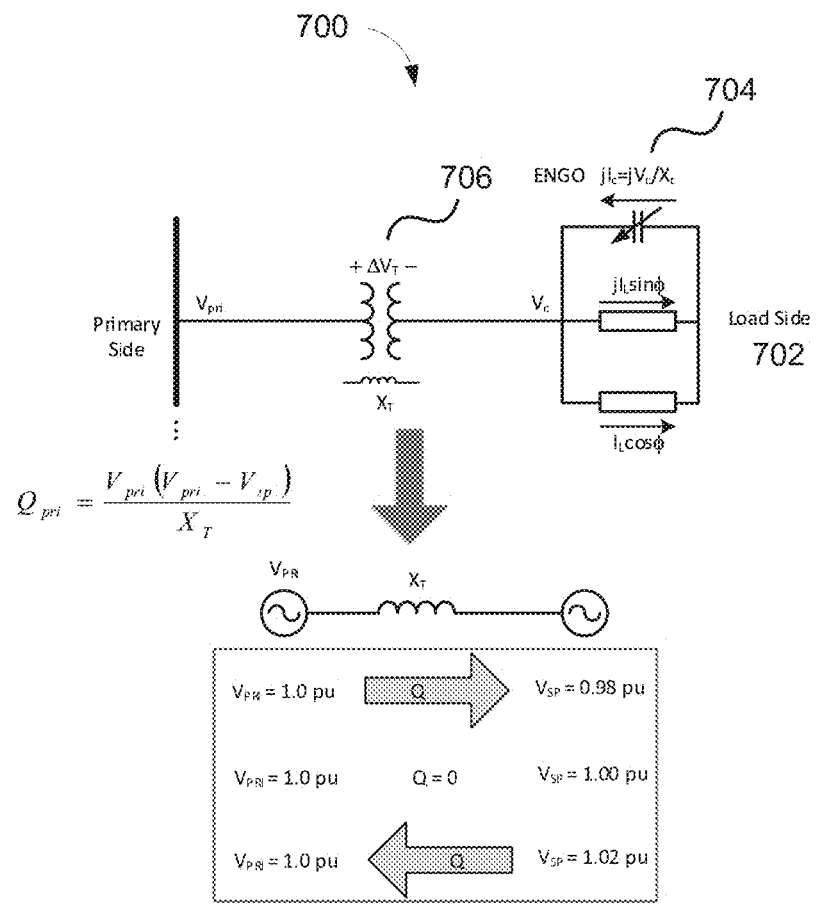
FIG. 7 illustrates a simplified schematic representation of the example power system and load model of FIG. 6.

FIG. 7 illustrates a simplified model 700 for local edge of network grid control, comprising a transformer and load model such as that illustrated in FIG. 6. On the load side 702, a distributed VAR device 704 (e.g., an ENGO) may inject kVARs to maintain the voltage according to a voltage set point. However, the primary voltage on the primary side may be considered to be independent of the voltage on the load side, as a single distributed VAR device, with its small rating, cannot impact the voltage on the primary side. However, by working against the impedance $X_T$ of transformer 706, the distributed VAR device can regulate the voltage on the secondary side.

Within its control range, a distributed VAR device may transform the load side to a voltage source. The primary side reactive power flow (kVARs) may be controlled by controlling the voltage set point. When the voltage set point $V_{sp}$ is set higher than the primary voltage $V_{PRI}$, reactive power flows from the secondary side to the primary, while the opposite happens when $V_{PRI}$ is higher in magnitude than $V_{sp}$. When the voltage set point $V_{sp}$ is set to equal to the primary voltage $V_{PRI}$, unity power factor is realized.

Figure 8A:
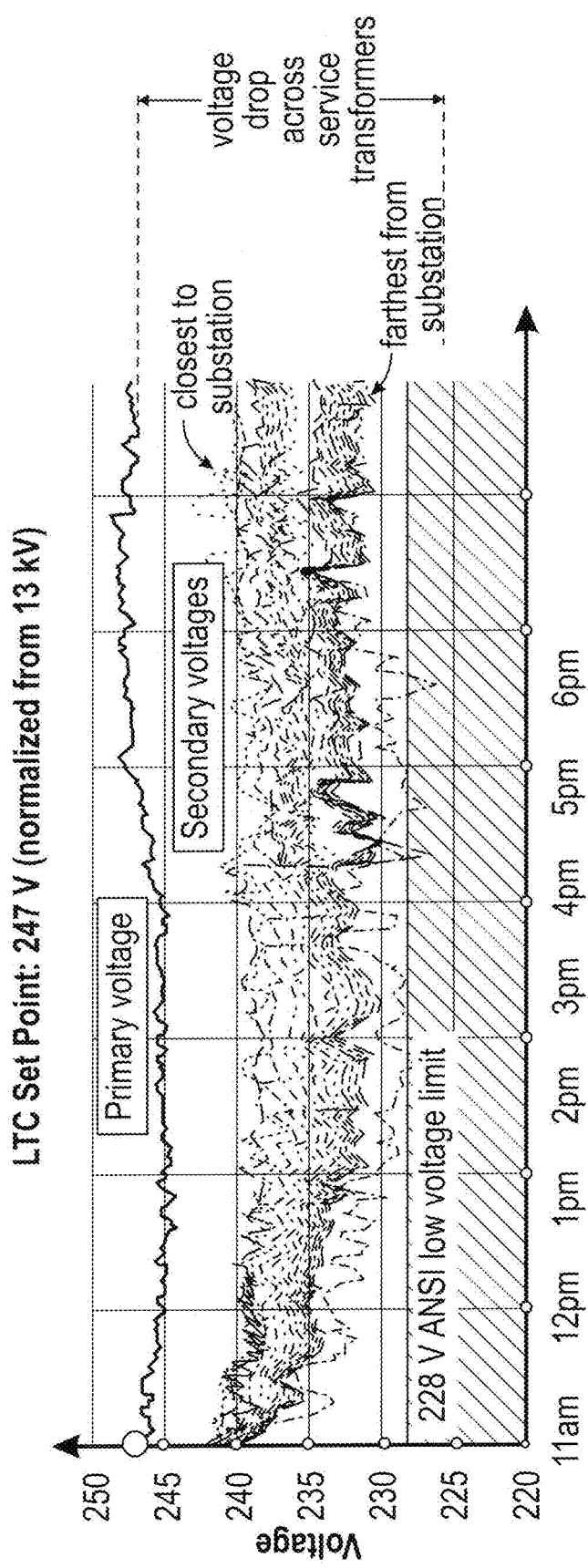
FIGS. 8A, 8B, 8C, and 8D illustrate example effects of implementing various embodiments of the technology disclosed herein with regard to primary and secondary voltages.
Figure 8B:
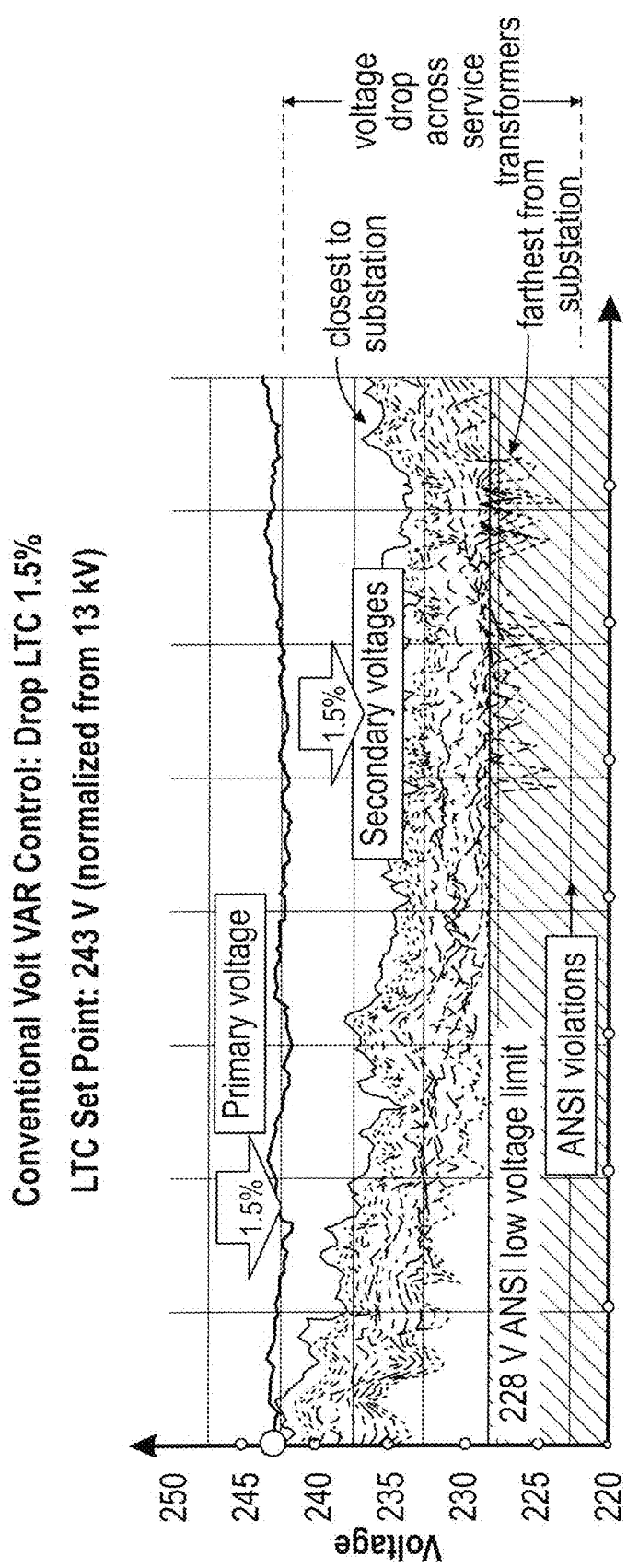
Figure 8C:
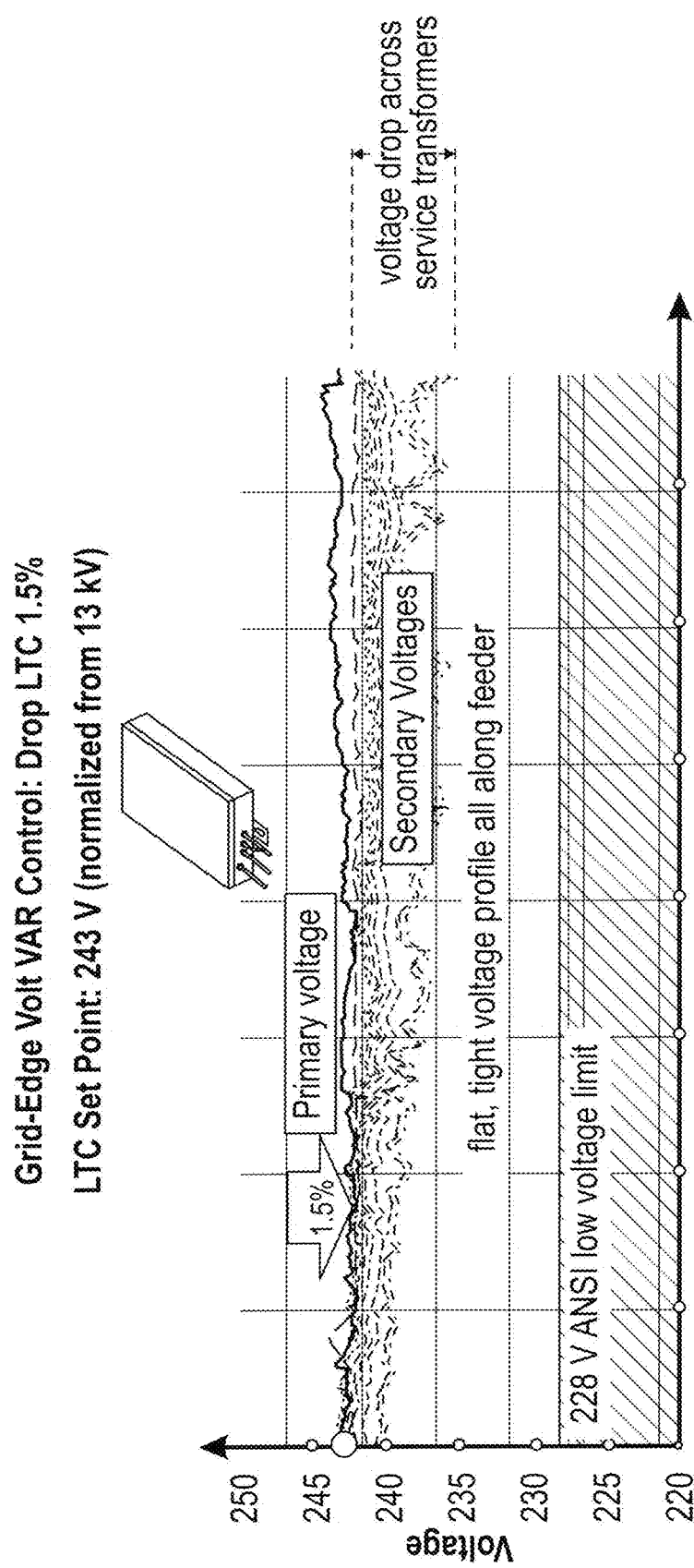
Figure 8D:
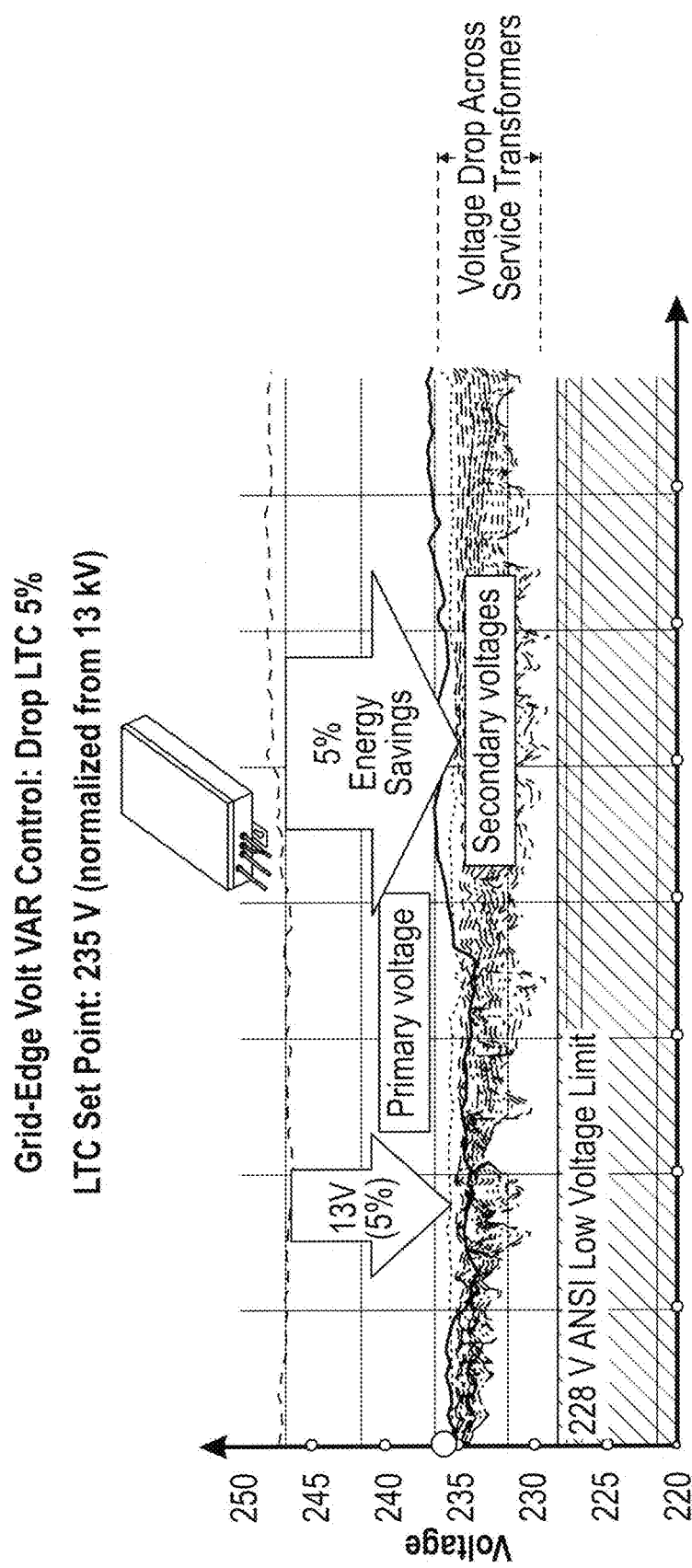

Importantly, a further advantage results from the application of voltage and VAR control as disclosed herein that is unexpected as illustrated in FIGS. 8A-8D. FIG. 8A illustrates an example chart reflecting the primary (substation voltage) at approximately 247 Volts and secondary voltages at a plurality of nodes across a feeder line. The ANSI low voltage limit is at 228 Volts. FIG. 8B illustrates a scenario in which, in an attempt to save some energy by dropping the voltage at the primary and secondary sides, e.g., by approximately 1.5 percent. However, ANSI violations begin to occur, as the secondary voltages begin to dip below the ANSI low voltage limit. As illustrated in FIG. 8C, when voltage and VAR control is enabled, the primary and secondary voltages "meet" (e.g., to within approximately one percent) thereby eliminating the inductive loss observed in FIGS. 8A and 8B due to the voltage drop across transformers and lines, which conventionally can result in, e.g., seven to eight percent difference between primary and secondary voltages. Additionally, ANSI violations cease as well. FIG. 8D illustrates that advantageously still, voltage can be dropped, in this example, by approximately five percent without introducing ANSI violations. Thus five percent energy savings can be realized without the problems experienced in conventional power systems. It should be further noted that voltage and VAR control devices need not be present at each and every node in order to realize the above-described advantages—a very unique aspect of the technology disclosed herein. That is, with only some of the nodes having voltage and VAR control enabled, the same or substantially similar trends in voltage profile still result—a self-balancing effect is observed at a feeder level.

The example scenario illustrated by the voltage profiles shown in FIGS. 8A-8D and explained above suggests that various embodiments are able to provide voltage and VAR control on the secondary side at a connected node, as well as at other points on the feeder, even where VAR source devices are not connected. This means that system-level improvements are being realized automatically without any need (or little need) for some centralized control system/mechanism(s). That is, as more edge of network grid VAR source devices are added to secondary feeders connected to a primary distribution circuit, the power system is able to automatically self-balance to the point where the primary voltage becomes equal to the secondary voltage setpoint. This can provide a distinct advantage, e.g., over systems and methods that rely on controlling voltage through a series-connected device, which may improve voltage control at one specific node, but can also degrade the voltage at other nodes on the feeder.

Further to the above, the ability to automatically self-balance allows the feeder to be operated with a controlled power factor. Adding the ability to control each edge of network grid VAR source device as an individual unit or in the aggregate allows for, e.g., managing solar PVs' effects on individual circuits without sacrificing overall grid stability and voltage and VAR optimization benefits.

Figure 9:
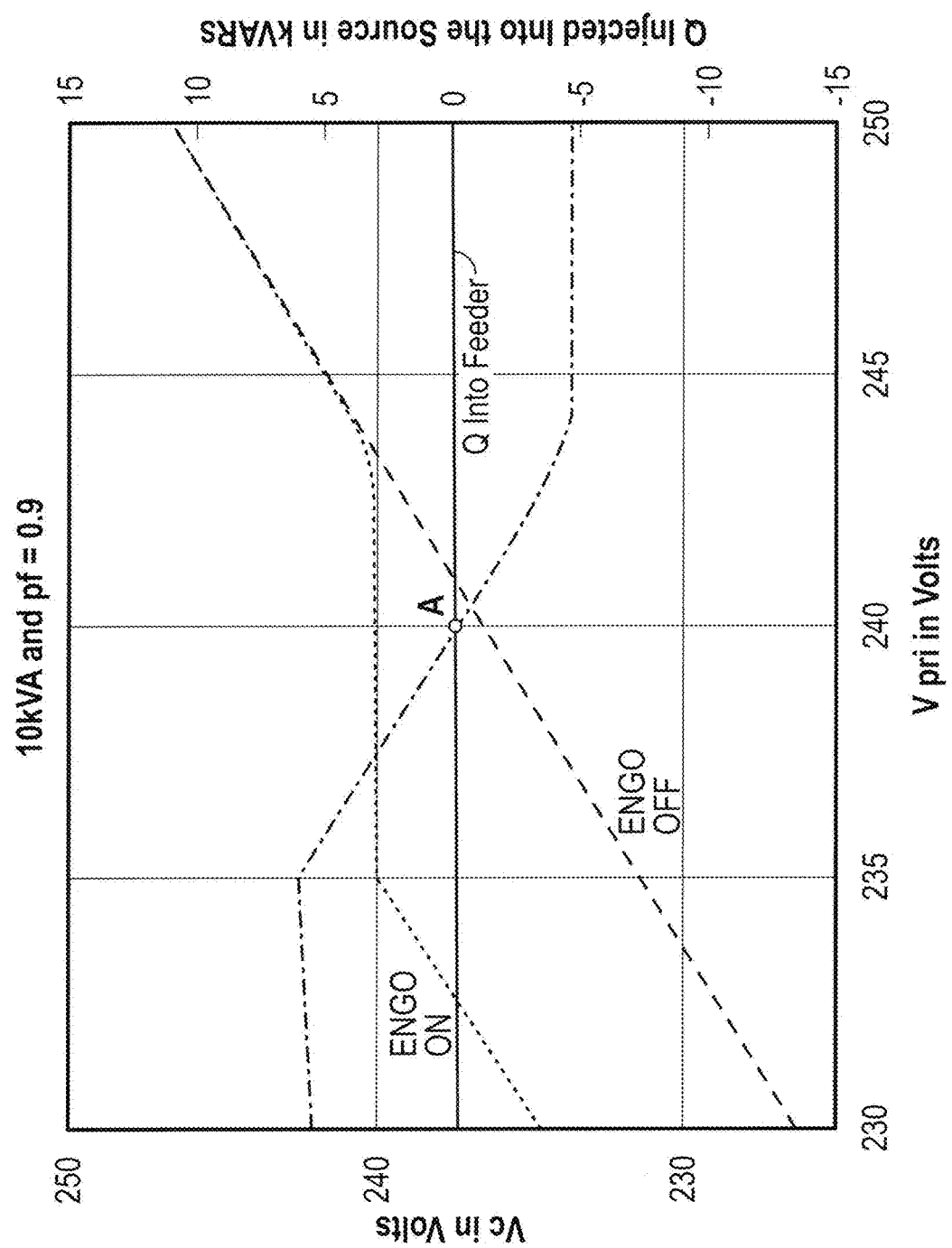
FIG. 9 is a graph illustrating an example local operating point of a power system comparing a scenario where edge of network grid control is enabled to a scenario where it is not.

FIG. 9 illustrates an example of a local operating point and characteristic curve of the power system of FIG. 6 with and without edge of network grid VAR source devices enabled. Again, the power system can comprise a 25 kVA Transformer (7 kV/240V), six percent impedance (including line), a load with 5-25 kVA and 0.7 to 1.0 PF, a distributed VAR device (e.g., an ENGO device) that may provide 0-10 leading kVAR, a 3 MW feeder, a 300 kVAR/phase primary capacitor bank, and a transmission line, where the line impedance is 5.65 ohms and line length is 3 miles.

When the distributed VAR device is disabled, the load voltage Vc varies linearly with the primary voltage $V_{PRI}$. However, the load voltage is desired to have a narrow range (e.g., 240+/−1 volt). When the distributed VAR device is enabled, the load voltage Vc is regulated to the Vsetpoint (e.g., 240+/−1 volt) within its control range. As an example, when $V_{PRI}$ is in the range of 234 to 245 volts, Vc is maintained in the desired range (e.g., 240+/−1 Volts). Outside of the control range, the distributed VAR device operates in a saturated mode i.e. it injects its maximum/minimum capacity of VARs and tries to maintain voltage regulation. Finally, depending on the load power factor and loading level, the VARs injected into the feeder (from secondary side to primary side or vice versa) vary. For example, with the primary voltage at 235V, when the load VAR is lagging 4.9 kVAR, in order to regulate the voltage Vc to a setpoint voltage Vsp the distributed VAR device may inject 10 kVAR leading reactive power, so the system has a leading 5.1 kVAR total reactive power. As another example, with the primary voltage at 243V and with the load VAR still lagging at 4.9 kVAR, in order to regulate the voltage Vc, the distributed VAR device may inject 1.4 kVAR and cause 3.5 kVAR lagging to be sourced from the primary side. Finally, a very unique result of this approach can be illustrated by considering Point A which shows zero reactive power injection when the primary voltage $V_{PRI}$ equals the setpoint voltage (Vc=Vsp=$V_{PRI}$).

Figure 10:
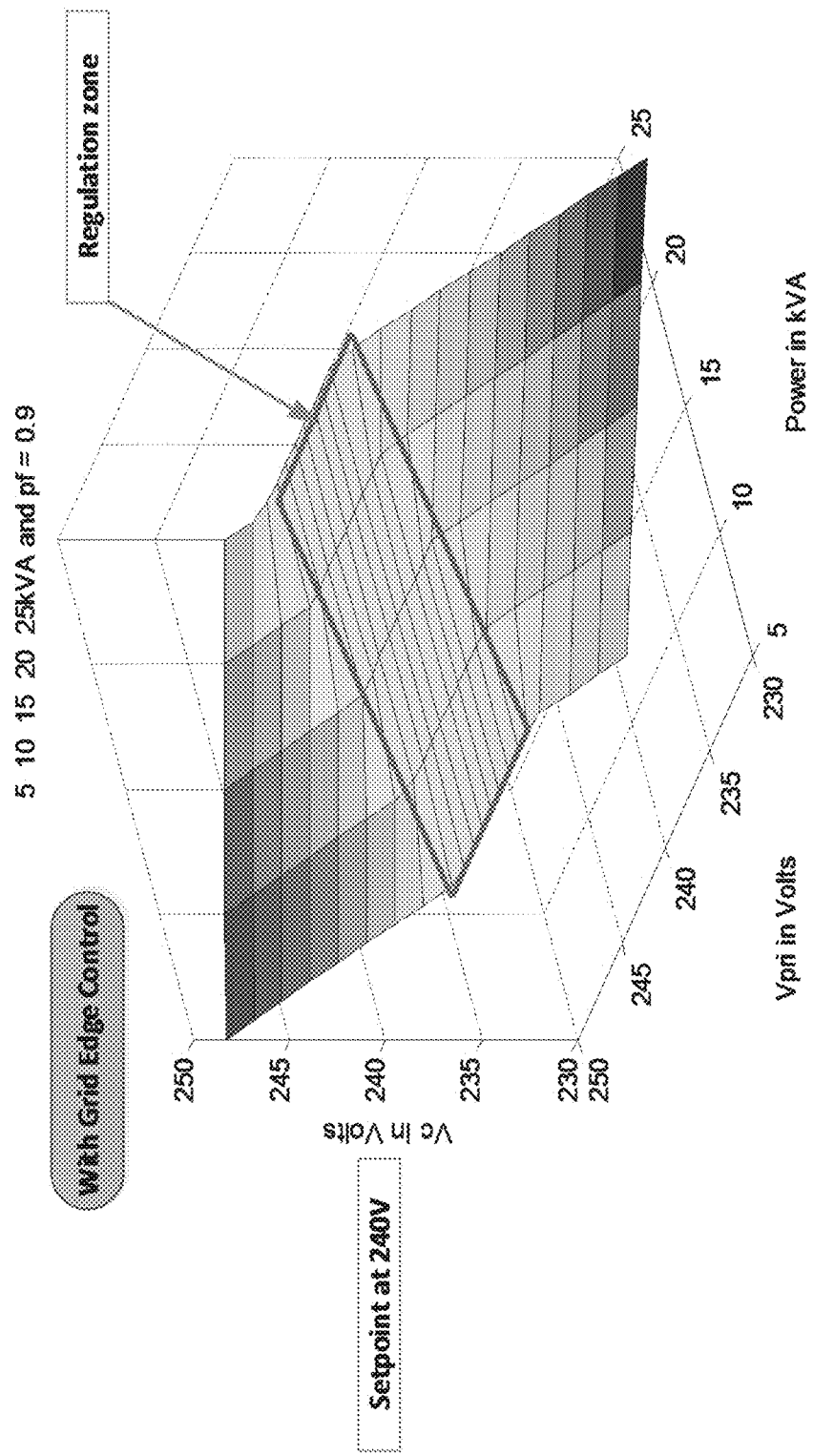
FIG. 10 illustrates a characteristic plot for load voltage and VAR plot of an example power system with grid edge control.

FIG. 10 illustrates a load voltage and reactive power plot of a power system with a distributed VAR device enabled in accordance with various embodiments. The Vsetpoint is set to 240 Volts. As illustrated, the load voltage Vc and the primary voltage $V_{PRI}$, as well as the load level may be varied over the target range. The voltage regulation is achieved over a wide primary voltage and output power range shown as the flat rectangular region.

Figure 11:
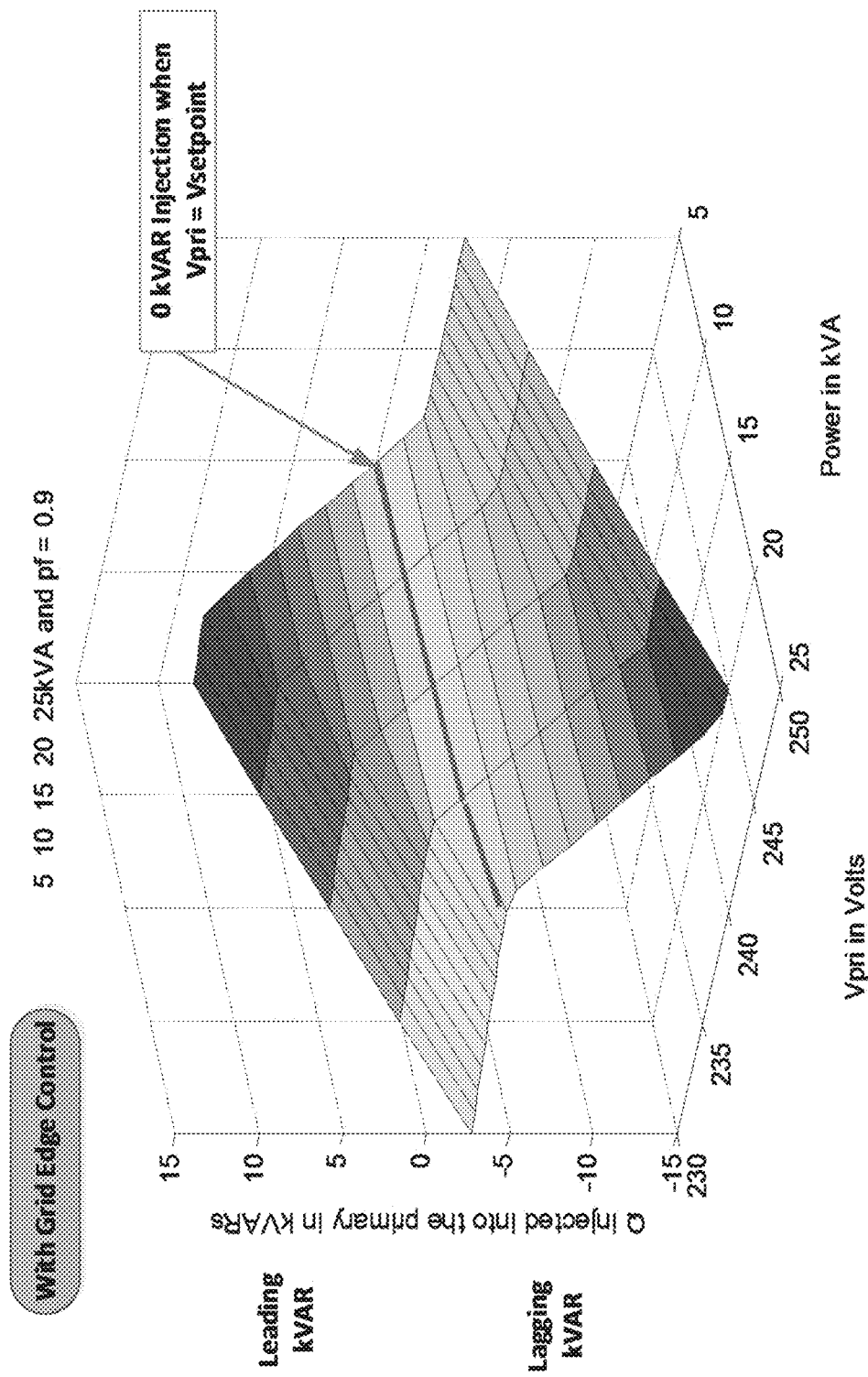
FIG. 11 illustrates example control range over which VAR injection is controlled at each load of the system with Grid Edge Control whose load voltage and VAR plot is illustrated in FIG. 9.

FIG. 11 illustrates the VAR control range as a function of primary voltage $V_{PRI}$, as load power is varied from 5 kVA to 25 kVA at a fixed power factor of 0.9 pf. As illustrated, the primary side reactive power injection can be varied as the primary side voltage and load level is varied. When the primary side voltage $V_{PRI}$ equals the secondary side set point voltage (Vc=Vsp), the injected reactive power level is zero, delivering unity power factor, it should be noted that this occurs regardless of the power level and power factor of the load. As such, via the voltage set point control, leading or lagging reactive power may be delivered. A unity power factor operation may be achieved, independent of actual load VARs, by maintaining voltage setpoint $V_{sp}$ at a value equal to the primary side voltage. This is achieved without any sensing of the actual load current or VARs (i.e., independent of VAR measurements) (nor without knowledge of feeder topology, i.e., independent of feeder topology information), resulting in substantially simpler implementation as compared to traditional power factor correction devices that require current measurement and phase angle information between voltage and current. That is, voltage VAR control that can be achieved in accordance with various embodiments does not require knowledge of the topology of the feeder, and only relies on basic connectivity, which is in sharp contrast to existing voltage VAR optimization schemes that rely on the topology of the feeder. Any change in topology occurring due to a fault detection isolation and/or restoration scheme changes the feeder topology, and substantially changes the optimization done previously. The independence from topology in realizing voltage VAR optimization is very novel. It should be noted that, as described herein, the more distributed VAR sources that are present, the more easily/certain self-balancing can be achieved. Accordingly, the number of VAR sources that may be needed to achieve self-balancing can depend on topology, although once a threshold of VAR sources is met, topology information need no longer be relied upon. The method of operating a system at unity power factor without sensing current and phase angle information with the use of only voltage measurements and setpoint control is completely unique, highly counterintuitive and has never been conceived or thought before, if not felt impossible to achieve.

Returning to the power system modeled in FIG. 6, on the primary side, an injection of 100 kVAR reactive power per phase may yield a voltage difference at 2.8 Volts on a 240 V base. The voltage change per unit reactive power is 0.028V/kVAR. On the secondary side, an injection of 10 kVAR/phase may yield a voltage difference at 5.6 volts on 240 V base. The voltage change per unit reactive power is 0.56 V/kVAR. Therefore, the impact of secondary side control is already 20 times greater than that of the primary side.

Reactive power injected by each individual distributed VAR device may be aggregated on the primary side to provide additional voltage regulation. For example, ten distributed VAR devices, each of which have 10 kVAR may provide a total of 50 kVAR reactive power on the primary side to provide a 1.4 Volt boost, which amounts to a total of 7 Volts on the secondary side. In addition, each load coupled to the distributed VAR device may observe different control action as needed, which is not possible under conventional centralized command and control.

Figure 12:
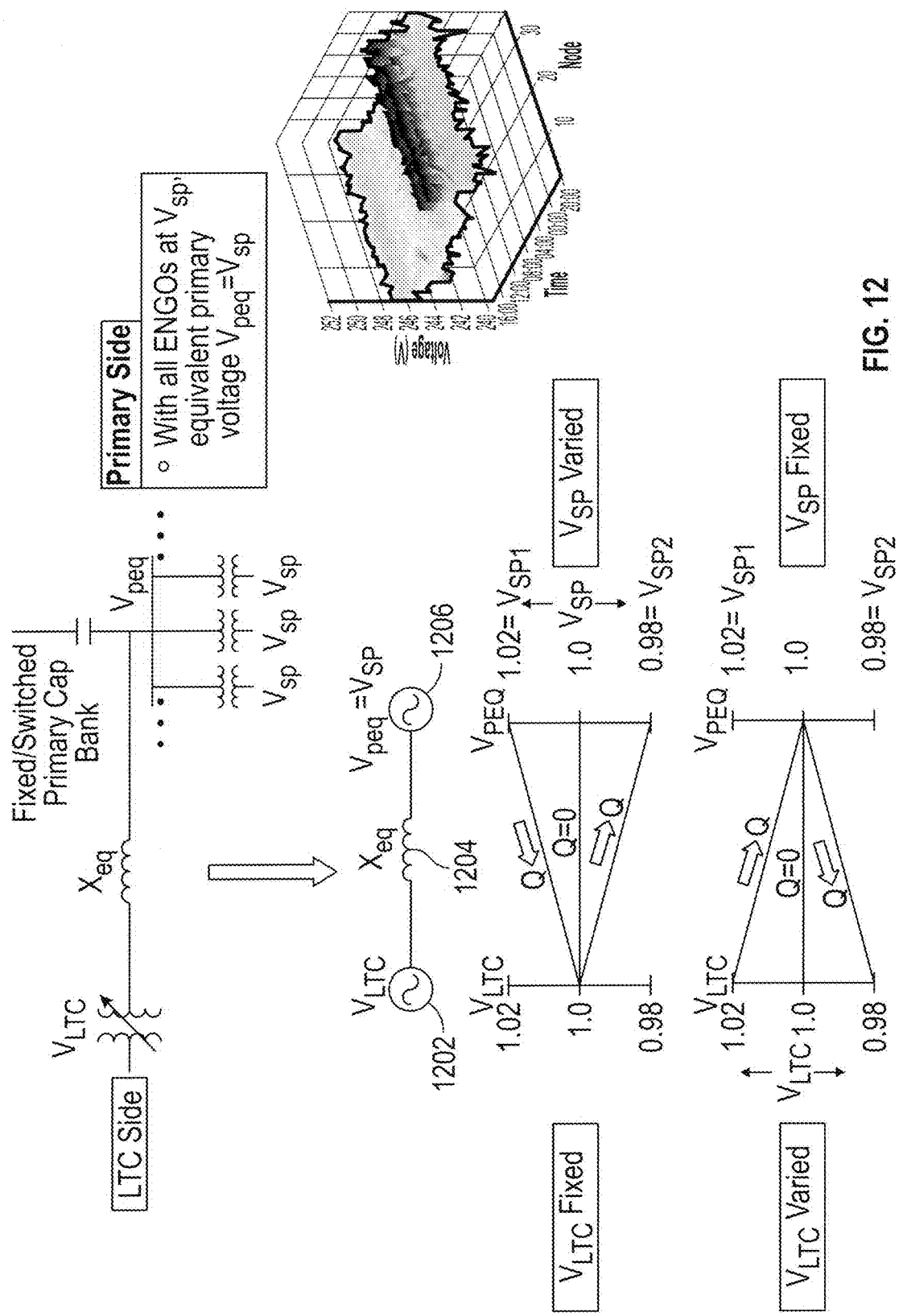
FIG. 12 is a schematic representation illustrating an example comparison between primary and secondary side VAR control.

FIG. 12 illustrates how local level model developed in FIG. 6 can be aggregated to understand and achieve feeder level control. As more distributed VAR sources, which are regulating the voltage at the local terminals, increase on the system, provided that all the VAR sources are regulating the voltage to the same level (or nearly the same) for instance say a voltage setpoint Vsp, it is observed that the primary side voltage also becomes equal to this setpoint voltage Vsp. This can be explained as follows, considering a plurality of distributed VAR source devices all set to the same voltage setpoint, when the primary voltage is lower than the setpoint voltage, VARs start flowing from the VAR source device to the primary side until the voltages equalize and the VARs stop flowing. Likewise, if the primary voltage is higher than the setpoint voltage, VARs from the inductive load are pulled, again, until the voltages equalize. By running multiple edge of network grid VAR source devices at the same or similar voltage setpoints (but still tweakable to compensate for certain drops/increases), this results in the aforementioned self-balancing aspect of the technology disclosed herein. Now, the feeder is reduced to a model that can be thought of as a voltage source (VLTC) 1202 representing the substation transformer, and inductive component 1204 representing line impedances, and a second voltage source $V_{peq}=V_{sp}$ 1206, as a result of the self-balancing aspect of this control. As alluded to previously, when the two voltages are equal, in this case VLTC=Vpeq=Vsp, the reactive power flowing within the substation transformer 1204 becomes zero, and unity power factor operation is obtained at a feeder level. This is independent of the total real and reactive power being demanded by loads on the system at any instant of time. Therefore, irrespective of the operating condition of the feeder and without any knowledge and visibility of local loads or even feeder level real or reactive power and/or current/voltage, the voltage and power factor of the entire feeder can be regulated with a simple setpoint control.

Essentially, power factor compensation can be determined without the need for measuring load power factor. Additionally still, secondary side voltage can be increased above the substation voltage VLTC resulting in leading VARs flowing into the power system or secondary side voltage can be decreased below the substation voltage VLTC resulting in lagging VARs flowing into the power system. As such, the feeder can be "converted" from a stochastic problem into what is essentially a feeder-level STATCOM. Two very unique properties are realized: first, by controlling the differential voltage (VLTC−Vsp) the reactive power on the feeder is controlled dynamically, achieving a STATCOM-like functionality from the feeder; second, by controlling the common-mode voltage (VLTC+Vsp)/2, real power can be controlled. For example, up to +/−5% of demand control can be achieved with controlling the common-mode voltage.

Figure 13:
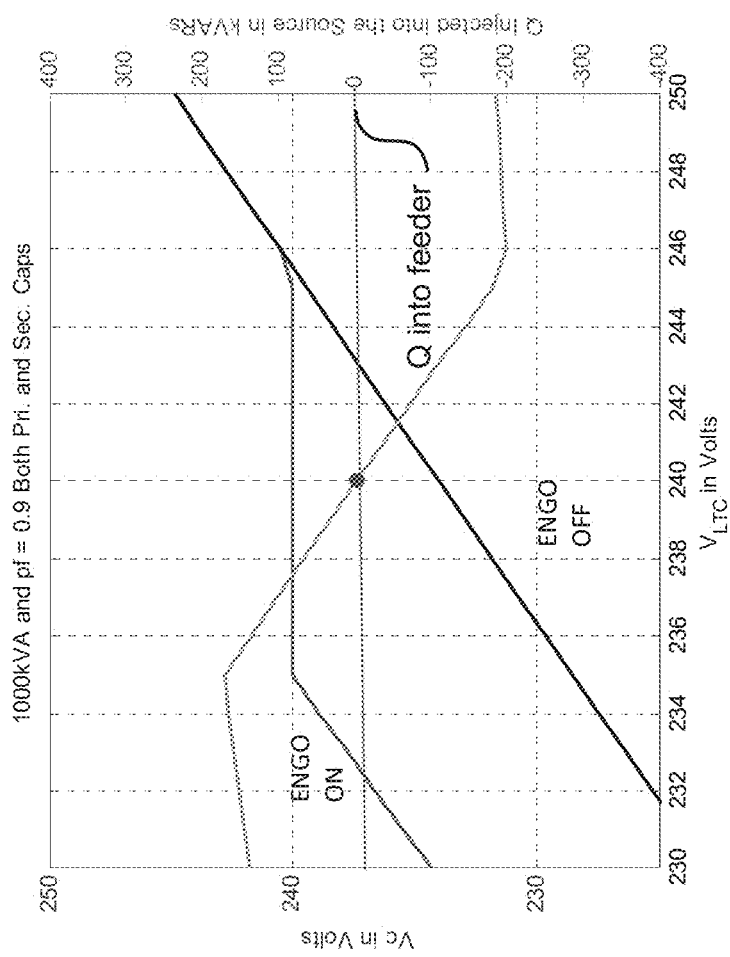
FIG. 13 is a graph illustrating an example feeder level characteristic curve of a power system in which a scenario with voltage and VAR control is enabled is compared with a scenario in which it is not enabled.

FIG. 13 illustrates an example feeder level operating point of a feeder in which a distributed VAR source devices are both enabled and disabled. As illustrated, when a distributed VAR device is enabled, independent of load VARs, when the primary voltage $V_{PRI}$=Vc (=Vsp setpoint voltage), no amount of reactive power 0 kVARs is injected into a feeder. By changing the primary side voltage $V_{PRI}$ or Vc setpoint, the amount of reactive power (i.e., lead or lag VARs) delivered to feeder may be regulated. As such, compared with primary capacitor banks, various embodiments may realize at least twenty times the level of feeder level VAR control. By setting the LTC set point (i.e., $V_{PRI}$) equal to the setpoint voltage (Vc setpoint) unity power factor at the feeder can be ensured. Varying LTC or Vc setpoints may deliver fast controllable lead/lag VARs at the substation. Furthermore, independent demand control, energy reduction, energy efficiency and feeder VARs is also provided.

Figure 14:
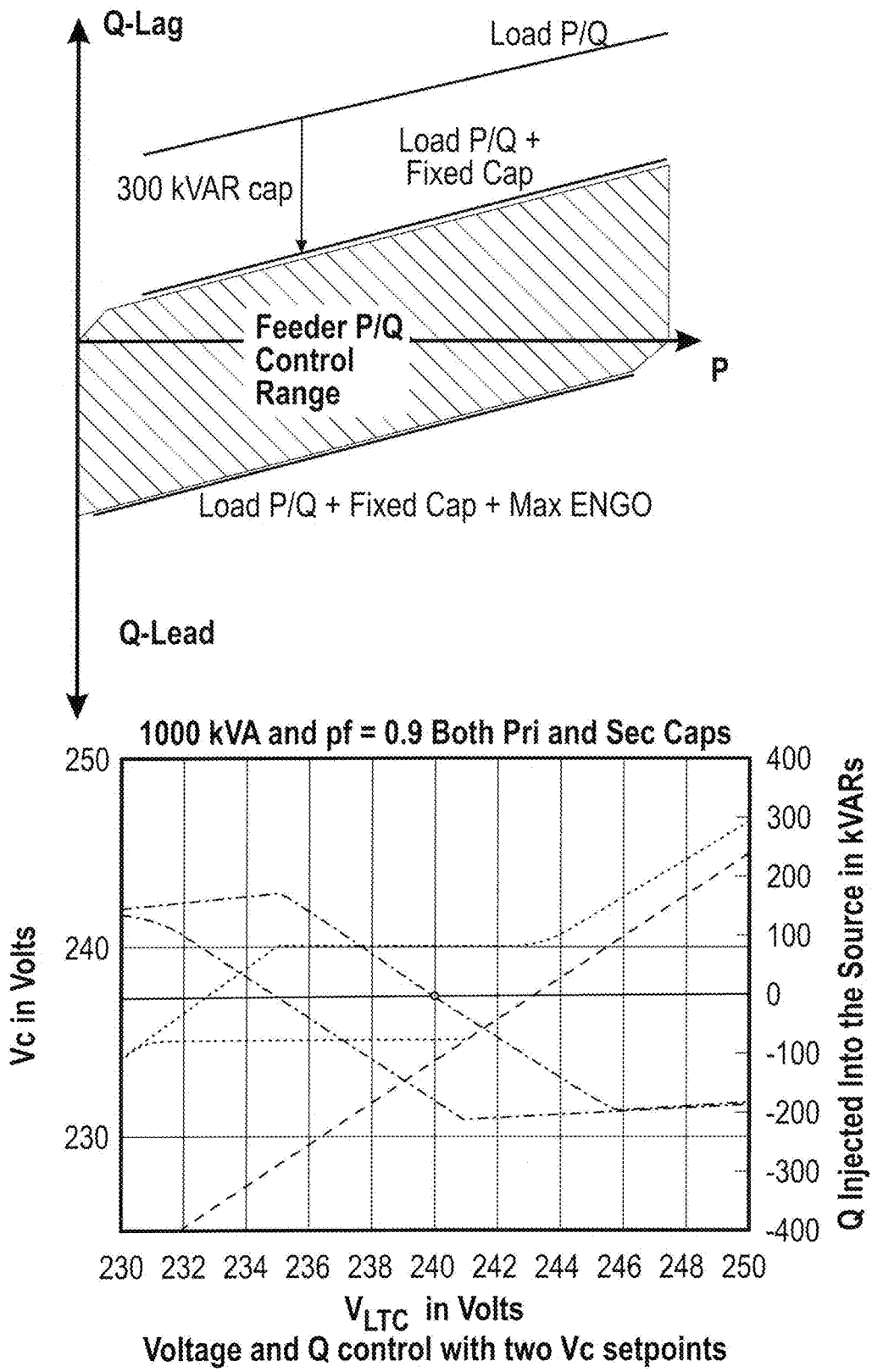
FIG. 14 illustrates an example of feeder control in accordance with various embodiments of the technology disclosed herein.

FIG. 14 illustrates an example feeder control in accordance with one embodiment of the technology disclosed herein. One example of the feeder parameters may be as follows: 3 MW @ 0.95 PF at peak loading (900 kVARs lagging); 1 MW @ 0.9 PF at minimum load (400 kVAR lagging); Fixed capacitor bank of 300 kVAR; 60 ENGO V10 units for a maximum of 600 kVAR.

Figure 15:
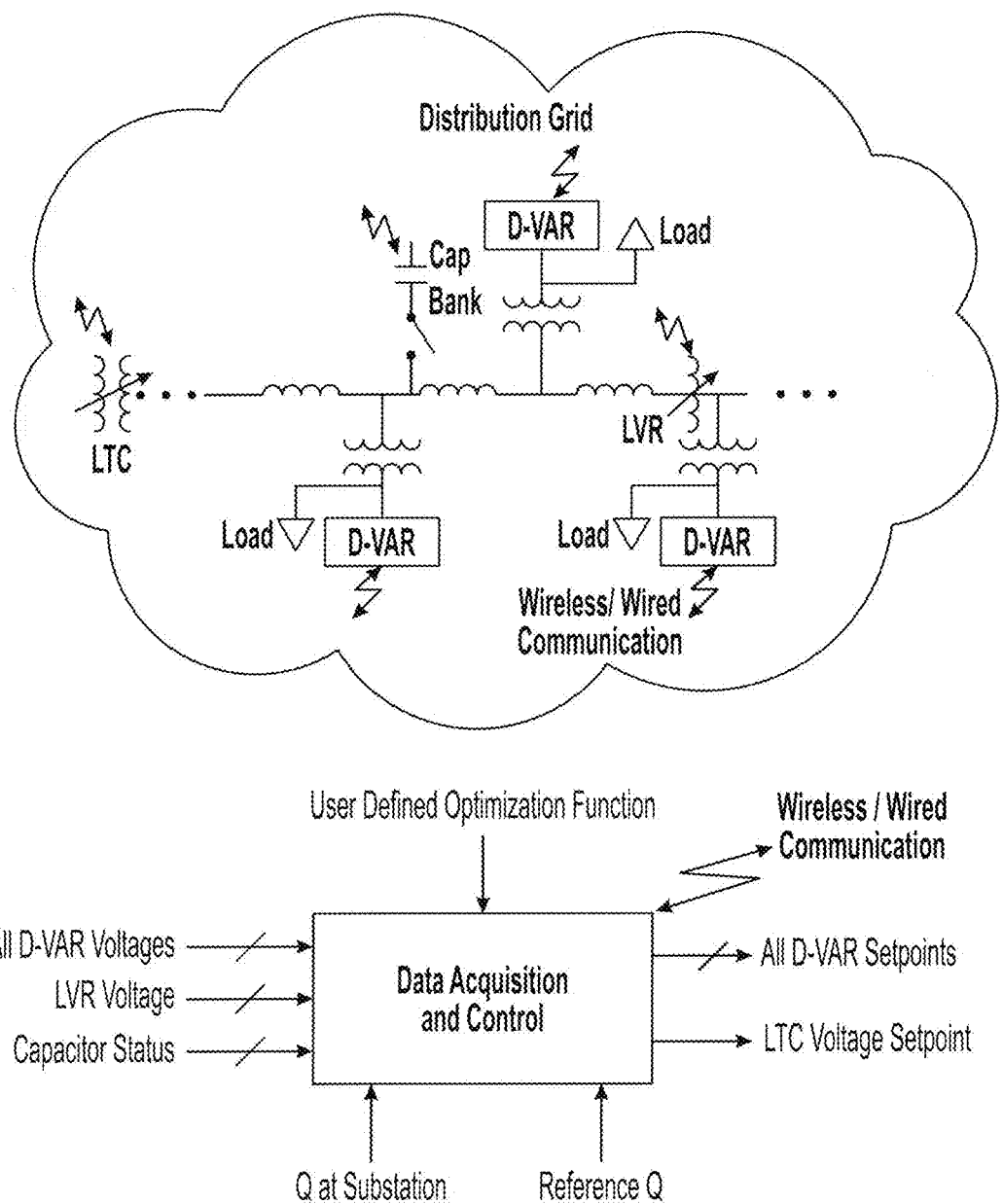
FIG. 15 illustrates an example control diagram for effectuating voltage and VAR optimization in accordance with various embodiments of the technology disclosed herein.

FIG. 15 illustrates an example control diagram. A user may input an optimization function such as CVR, loss minimization etc. into an optimizer which computes the setpoints $V_{SPi}$ for all the distributed VAR devices on a power system. These setpoints may be exactly the same or somewhat different. These setpoints are dispatched to all the distributed VAR devices through a communication channel (wired or wireless). This achieves the objective of local control. The controller may take inputs from capacitor banks and a Line Voltage Regulator (LVR), in addition to the distributed VAR devices to compute the setpoints. When all the distributed VAR devices work together, they start impacting the regional level VARs and collectively affect the feeder reactive power. Although not necessary, the reactive power reference value Qref and the measured reactive power Qsub may be also provided as an input to the optimizer, if reactive power control is the objective. The optimizer may then use these values to determine the desired LTC voltage $V_{LTC}$. For example, to achieve CVR keeping the power factor of the system at unity, the voltage of the LTC may be reduced to a target that achieves the CVR benefits. The setpoint voltage of a distributed VAR device may be matched to the LTC voltage to ensure zero net reactive power.

Figure 16:
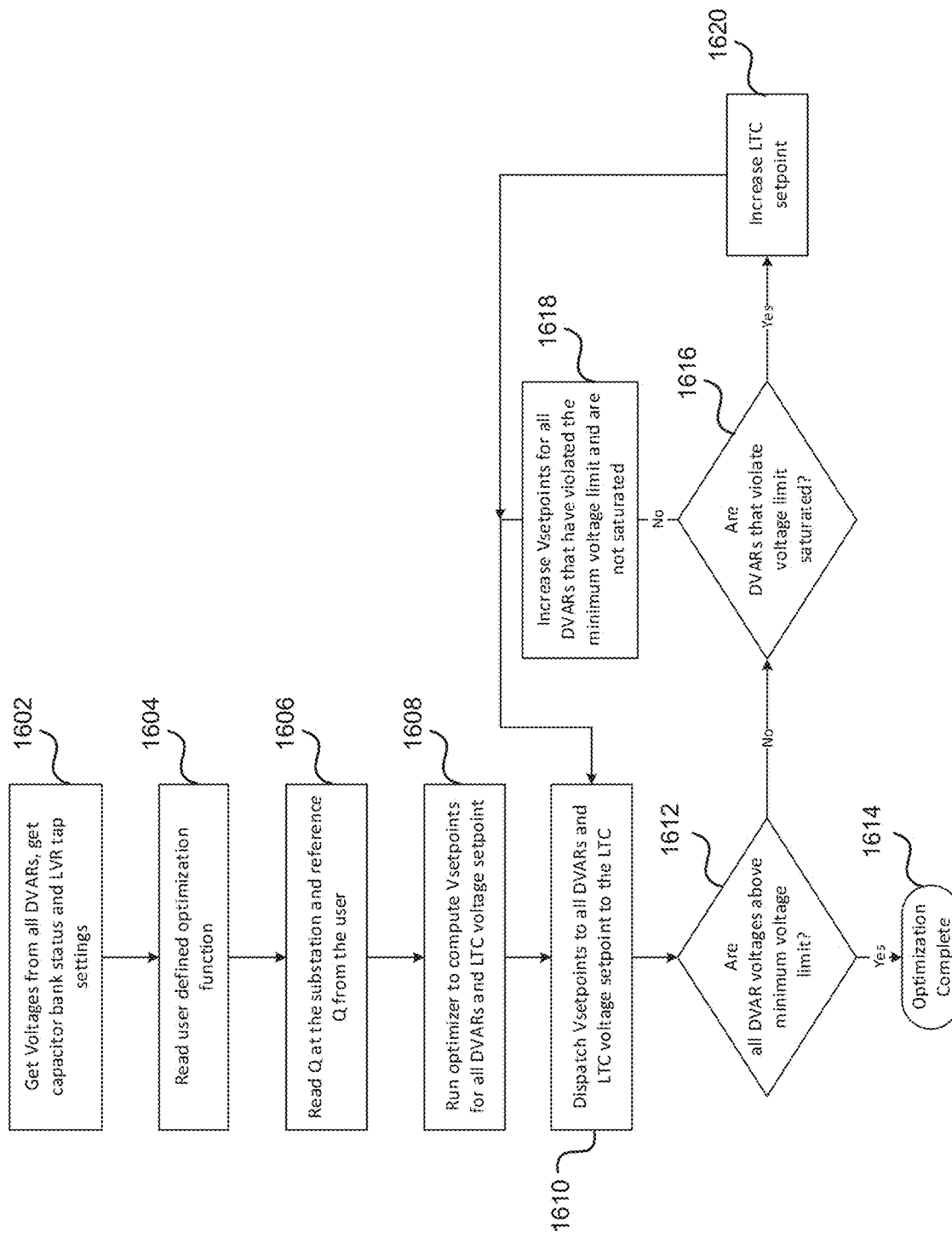
FIG. 16 is an operational flow chart illustrating example processes performed for achieving voltage and VAR optimization in accordance with various embodiments of the technology disclosed herein.

FIG. 16 illustrates an example flow chart for optimizing voltage and reactive power in accordance with various embodiments. At operation 1602, voltages from all distributed VAR source devices in a power system are obtained, as well as capacitor bank status and LVR tap settings. At operation 1604, a user-defined optimization function is read/analyzed to determine desired optimization. At operation 1606, if available, the reactive power Q is read at the substation level as well as a reference reactive power Q specified by the user. It should be noted that one or more of operations 1602-1606 may be optional. As previously described, parameters such as the reactive power Q may not be needed, capacitor bank(s) need not be controlled/connected to/compensated for. However, to fine-tune system operation, obtaining such parameters can be performed and voltage setpoints can be derived therefrom. At operation 1608, an optimizer is run to compute the setpoint voltages for each distributed VAR source device as well as the setpoint voltage for the LTC. At operation 1610, the voltage setpoints are dispatched to the distributed VAR source devices and the setpoint voltage for the LTC is likewise dispatched to the LTC. If all the distributed VAR source device voltages are determined to be above a minimum voltage limit at operation 1612, optimization can be completed at operation 1614. If the distributed VAR source device voltages are below some minimum voltage limit (determined at operation 1612), it is determined whether the distributed VAR source devices that violate the minimum voltage limit, are saturated at operation 1616. If so, the LTC voltage setpoint is increased at operation 1620. If not, the voltage setpoints for all the distributed VAR source devices that have violated the minimum voltage limit and are not saturated are increased at operation 1618. The process returns to operation 1610 to dispatch these increased voltage setpoints.

At a system level, the voltage profile and VARs at a substation can be independently controlled by adjusting VLTC and $V_{sp}$ independently. $V_{sp}$ can be set to be the same for all the distributed VAR devices, or the setpoint voltage be set differently. A VLTC can be controlled to adjust the voltage and the VARs similar to the manner discussed above. Those skilled in the art would appreciate that the distributed VAR sources using the described approach may cover only 15-20% of the nodes on the system and yet achieve a completely flat voltage profile across the feeder by virtue of the self-balancing feature. This capability is not feasible under conventional state-of-the-art systems and methods, where VAR control typically requires capacitor banks to be switched, and is thus limited in terms of dynamic capability. The switched capacitor banks also do not allow compensation of varying voltages at individual nodes. The overall value delivered to utilities thus includes individual node voltage control, voltage flattening across the feeder, feeder level power factor control, primary side voltage control, enhanced conservation voltage reduction, dynamic and enhanced demand control and feeder level dynamic VAR control—all using VLTC and $V_{sp}$ as the controlled variables.

Various embodiments provide an unprecedented V/Q control range. Regulating D-VAR voltage setpoint may provide demand and CVR management. A wide range of decoupled voltage and VAR control is provided. By regulating the LTC setpoint equal to the distributed VAR source device setpoint, zero reactive power flow is realized thereby achieving a unity power factor operation. As an example, those skilled in the art would appreciate that with this approach even with only leading VAR sources regulating local voltages to a defined setpoint Vsp such as ENGO devices, an effective lead-lag reactive power control at the substation can be achieved.

Figure 17:
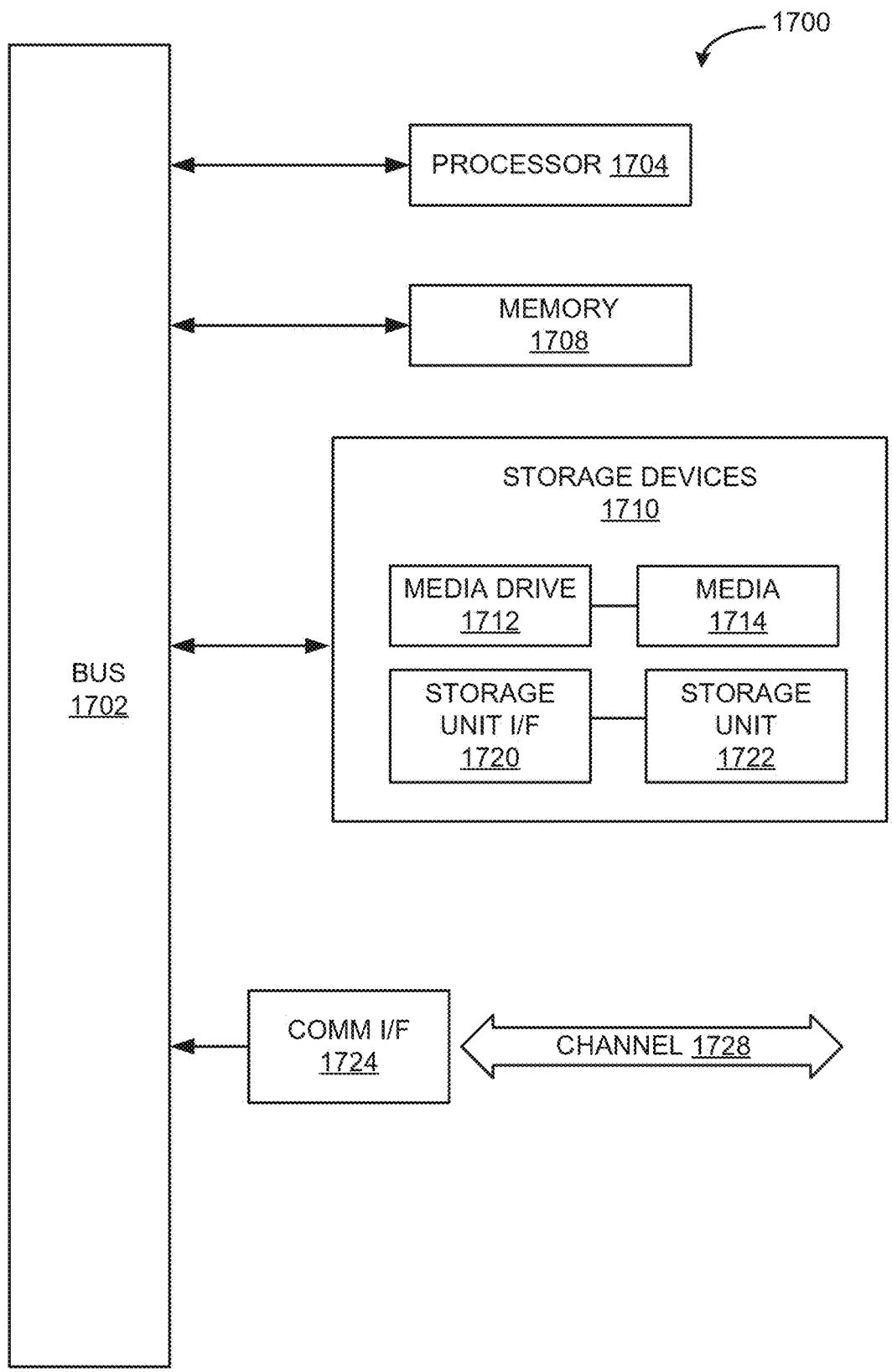
FIG. 17 is a schematic representation of an example computing module that may be used to implement various features of embodiments described in the present disclosure.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 17 which may be used to implement various features of the system and methods disclosed herein. Various embodiments are described in terms of this example-computing module 1700. After reading this description, it will become apparent to a person skilled in the relevant art how to implement the application using other computing modules or architectures.

Referring now to FIG. 17, computing module 1700 may represent, for example, computing or processing capabilities found within a self-adjusting display, desktop, laptop, notebook, and tablet computers; hand-held computing devices (tablets, PDA's, smart phones, cell phones, palmtops, etc.); workstations or other devices with displays; servers; or any other type of special-purpose or general-purpose computing devices as may be desirable or appropriate for a given application or environment. For example, computing module 1700 may be one embodiment of the data acquisition and control module of FIG. 15, a distributed VAR source device, and/or one or more functional elements thereof. Computing module 1700 might also represent computing capabilities embedded within or otherwise available to a given device. For example, a computing module might be found in other electronic devices such as, for example navigation systems, portable computing devices, and other electronic devices that might include some form of processing capability.

Computing module 1700 might include, for example, one or more processors, controllers, control modules, or other processing devices, such as a processor 1704. Processor 1704 might be implemented using a general-purpose or special-purpose processing engine such as, for example, a microprocessor, controller, or other control logic. In the illustrated example, processor 1704 is connected to a bus 1702, although any communication medium can be used to facilitate interaction with other components of computing module 1700 or to communicate externally.

Computing module 1700 might also include one or more memory modules, simply referred to herein as main memory 1708. For example, preferably random access memory (RAM) or other dynamic memory might be used for storing information and instructions to be executed by processor 1704. Main memory 1708 might also be used for storing temporary variables or other intermediate information during execution of instructions to be executed by processor 1704. Computing module 1700 might likewise include a read only memory ("ROM") or other static storage device coupled to bus 1702 for storing static information and instructions for processor 1704.

The computing module 1700 might also include one or more various forms of information storage mechanism 1710, which might include, for example, a media drive 1712 and a storage unit interface 1720. The media drive 1712 might include a drive or other mechanism to support fixed or removable storage media 1714. For example, a hard disk drive, a solid state drive, a magnetic tape drive, an optical disk drive, a compact disc (CD) or digital video disc (DVD) drive (R or RW), or other removable or fixed media drive might be provided. Accordingly, storage media 1714 might include, for example, a hard disk, an integrated circuit assembly, magnetic tape, cartridge, optical disk, a CD or DVD, or other fixed or removable medium that is read by, written to or accessed by media drive 1712. As these examples illustrate, the storage media 1714 can include a computer usable storage medium having stored therein computer software or data.

In alternative embodiments, information storage mechanism 1710 might include other similar instrumentalities for allowing computer programs or other instructions or data to be loaded into computing module 1700. Such instrumentalities might include, for example, a fixed or removable storage unit 1722 and an interface 1720. Examples of such storage units 1722 and interfaces 1720 can include a program cartridge and cartridge interface, a removable memory (for example, a flash memory or other removable memory module) and memory slot, a PCMCIA slot and card, and other fixed or removable storage units 1722 and interfaces 1720 that allow software and data to be transferred from the storage unit 1722 to computing module 1700.

Computing module 1700 might also include a communications interface 1724. Communications interface 1724 might be used to allow software and data to be transferred between computing module 1700 and external devices. Examples of communications interface 1724 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 1724 might typically be carried on signals, which can be electronic, electromagnetic (which includes optical) or other signals capable of being exchanged by a given communications interface 1724. These signals might be provided to communications interface 1724 via a channel 1728. This channel 1728 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 1708, storage unit 1720, media 1714, and channel 1728. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 1700 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer-implemented method for voltage and volt ampere reactive (VAR) control of a power system, comprising:
    determining a transformer voltage setpoint;
    setting a VAR voltage setpoint for a VAR device of a set of distributed VAR devices implemented in the power system, wherein the VAR voltage setpoint is within 2% of the transformer voltage setpoint in order to effectuate self-balancing of the power system, wherein the VAR device of the set of distributed VAR devices comprises a processor and is operatively connected to a secondary side of the transformer, the transformer comprising a service transformer of the power system, wherein each of the set of distributed VAR devices implement zero-droop control; and
    controlling the VAR device of the set of distributed VAR devices by applying, with the processor, a distributed control algorithm comprising determining whether to activate the VAR device based on the VAR voltage setpoint independent of instructions from another VAR device or a central controller;
    wherein the self-balancing occurs pursuant to at least a subset of the set of distributed VAR devices operating such that a primary side voltage equalizes with a secondary side voltage due to flow of VARs into the primary side, the flow of VARs automatically ceasing upon equalization of the primary side and the secondary side voltages resulting in zero net VARs, whereby a unity power factor is obtained at a feeder level by maintaining the VAR voltage setpoint at a value equal to the primary side voltage;
    wherein a substation load tap changer transformer is operated in accordance with a secondary voltage setpoint distinct from the transformer voltage setpoint to enable a change in VARs drawn at a feeder level, wherein the secondary voltage setpoint of the load tap changer transformer is increased in response to at least one of the distributed VAR devices being below a minimum voltage limit and operating at a limit of the at least one distributed VAR device to provide VARs.

2. The computer-implemented method of claim 1, further comprising dispatching VAR voltage setpoints to the set of distributed VAR devices, the set of distributed VAR devices being distributed along a feeder, wherein the dispatching of the VAR voltage setpoints is performed via at least one of wired and wireless communication mechanisms from a central command location.

3. The computer-implemented method of claim 1, further comprising dispatching the transformer voltage setpoint to a transformer operatively connected to the set of distributed VAR devices, wherein the dispatching of the transformer voltage setpoint is performed via at least one of wired and wireless communication mechanisms from a central command location.

4. The computer-implemented method of claim 1, further comprising determining whether any voltages associated with each of the set of distributed VAR devices exceed a voltage limit.

5. The computer-implemented method of claim 1, wherein the VAR voltage setpoint for each VAR device of the set of distributed VAR device is different from the VAR voltage setpoint for other VAR devices of the set of distributed VAR devices.

6. The computer-implemented method of claim 1, wherein the power system comprises a self-balancing power system such that the actual reactive power flow is reduced to zero subsequent to injecting reactive power into or pulling reactive power from a primary side of the power system.

7. The computer-implemented method of claim 1, further comprising one of increasing or decreasing the transformer voltage setpoint and the secondary voltage setpoint in unison to increase or decrease, respectively, power draw by one or more loads, power change sensitivity being dependent upon a type of the one or more loads.

8. The computer-implemented method of claim 1, further comprising one of increasing or decreasing the transformer voltage setpoint and the secondary voltage setpoint independently with respect to each other to at least one of provide centralized control for at least one of power and VARs drawn by a feeder of the power system, stabilize secondary voltage levels, reduce voltage drop across the service transformer, and increase voltage and VAR control predictability.

9. The computer-implemented method of claim 1, wherein the self-balancing occurs independent of VAR measurements.

10. The computer-implemented method of claim 1, wherein the self-balancing occurs independent of feeder topology information.

11. The computer-implemented method of claim 1, wherein each of the set of distributed VAR devices comprises one of an edge of network grid optimization device, a dedicated VAR source, a static synchronous compensator (STATCOM), an inverter, a VAR-enhanced smart meter, or an electric vehicle charger.

* * * * *